(12) United States Patent
Bernard et al.

(10) Patent No.: US 8,265,161 B2
(45) Date of Patent: Sep. 11, 2012

(54) PROCESSING OR COMPRESSING N-DIMENSIONAL SIGNALS WITH WARPED WAVELET PACKETS AND BANDELETS

(75) Inventors: Christophe Bernard, Paris (FR); Jerome Kalifa, Paris (FR); Erwan Le Pennec, Paris (FR); Stephane Mallat, Paris (FR)

(73) Assignee: Zoran (France), Malakiff (FR)

( * ) Notice: Subject to any disclaimer, the term of this patent is extended or adjusted under 35 U.S.C. 154(b) by 186 days.

(21) Appl. No.: 12/687,256

(22) Filed: Jan. 14, 2010

(65) Prior Publication Data

US 2010/0135400 A1  Jun. 3, 2010

Related U.S. Application Data

(62) Division of application No. 10/539,684, filed as application No. PCT/EP02/14903 on Dec. 17, 2002, now Pat. No. 7,944,974.

(51) Int. Cl.
*H04N 7/12* (2006.01)
*H04N 11/02* (2006.01)
*H04N 11/04* (2006.01)

(52) U.S. Cl. ......... 375/240.19; 375/240.12; 375/240.16; 375/240.18

(58) Field of Classification Search ............. 375/240.16, 375/240.19
See application file for complete search history.

(56) References Cited

U.S. PATENT DOCUMENTS

| | | |
|---|---|---|
| 5,384,725 A | 1/1995 | Coifman et al. |
| 5,526,299 A | 6/1996 | Coifman et al. |
| 5,917,943 A | 6/1999 | Washizawa |
| 6,233,357 B1 | 5/2001 | Li et al. |
| 6,836,569 B2 * | 12/2004 | Le Pennec et al. ........... 382/260 |
| 2003/0031369 A1 | 2/2003 | Le Pennec et al. |

OTHER PUBLICATIONS

Daubechies et al., "Factoring Wavelet Transforms into Lifting Steps", Program for Applied and Computational Mathematics, Princeton University, Princeton, NJ, pp. 1-26, Sep. 1996, revised Nov. 1997.
Daubechies et al.,"Wavelets on Irregular Point Sets", Phil. Trans. R. Soc. Lond. pp. 1-16, 1999.
Donoho et al., "Ideal Spatial Adaptation by Wavelet Shrinkage", Department of Statistics, Stanford University, Stanford, CA, USA, pp. 1-40, Jun. 1992, revised Apr. 1993.
Dragotti et al., "Footprints and Edgeprints for Image Denoising and Compression", Proceedings 2001 International Conference on Image Processing, ICIP 2001, Thessaloniki, Greece, Oct. 7-10, 2001, International Conference on Image Processing, New York, NY, IEEE, US, vol. 2 of 3, Conf. 8, pp. 237-240, XP001045559.

(Continued)

*Primary Examiner* — David Czekaj
*Assistant Examiner* — Chikaodili E Anyikire
(74) *Attorney, Agent, or Firm* — Lando & Anastasi, LLP

(57) ABSTRACT

A method and apparatus for processing or compressing an n-dimensional digital signal by constructing a sparse representation which takes advantage of the signal geometrical regularity. The invention comprises a warped wavelet packet transform which performs a cascade of warped subband filtering along warping grids of sampling points adapted to the signal geometry. It also comprises a bandeletisation which decorrelates the warped wavelet packet coefficients to produce a sparse representation. An inverse warped wavelet packet transform and an inverse bandeletisation reconstruct a signal from its bandelet representation. The invention comprises a compression system which quantizes and codes the bandelet representation, a decompression system, a restoration system which enhances a signal by filtering its bandelet representation, and a feature vector extraction system for pattern recognition applications of a bandelet representation.

5 Claims, 12 Drawing Sheets

OTHER PUBLICATIONS

Feig et al., "Computing Image Histogram from Compressed Date", SPIE 2898:118-124.

Hilton, "Wavelet and Wavelet Packet Compression of Electrocardiograms", Technological Report TR9505, Department of Computer Science, The University of South Carolina, Columbia, pp. 1-12.

Kalifa et al., "Minimax Restoration and Deconvolution", pp. 1-25.

Mallet, "A Theory of Multiresolution Signal Decomposition: The Wavelet Representation", IEEE Transactions on Pattern Analysis and Machine Intelligence 11:674-693, 1989.

Mallet et al., "Analysis of Low Bit Rate Image Transform Coding", IEEE Transactions on Signal Processing 46:1027-1042, 1998.

Mandal et al., "Fast Wavelet Histogram Techniques for Image Indexing", School of Information Technology and Engineering, University of Ottawa, Ottawa, Canada, pp. 1-15.

Mertins, "Image Compression via Edge-Based Wavelet Transform", University of Wollongong, Australia, pp. 1-21.

Pennec et al., "Image Compression with Geometrical Wavelets", IEEE, pp. 661-664, 2000.

Smith et al., "Exact Reconstruction Techniques for Tree-Structured Subband Coders", IEEE Transactions on Acoustics, Speech, and Signal Processing ASSP-34:434-441, 1986.

Starck et al., "The Curvelet Transform for Image Denoising", IEEE Transactions on Image Processing 11:670-684, 2002.

Starck et al., "Very High Quality Image Restoration by Combining Wavelets and Curvelets", Wavelets: Applications in Signal and Image Processing IX, San Diego, CA, USA, Jul. 30, Aug. 1, 2001, 4478:9-19, XP002244432.

Thevenaz et al., "Interpolation Revisited", IEEE Transactions on Medical Imaging 19:739-758, 2000.

Xu et al., "Three-Dimensional Embedded Subband Coding with Optimized Truncation (3-D ESCOT)", Applied and Computational Harmonic Analysis 10:290-315, 2001.

Daubechies et al., "Factoring Wavelet Transforms into Lifting Steps," Program for Applied and Computational Mathematics, Princeton University, Princeton, NJ, pp. 1-26, Sep. 1996, revised Nov. 1997.

Daubechies et al., "Waveletes on Irregular Point Sets," Phil. Trans. R. Soc. Lond. pp. 1-16, 1999.

Donoho et al., "Ideal Spatial Adaptation by Wavelet Shrinkage," Department of Statistics, Stanford University, Stanford, California, USA, Jun. 1992, revised Apr. 1993, pp. 1-40.

Dragotti et al., "Footprints and Edgeprints for Image Denoising and Compression," Proceedings 2001 International Conference on Image Processing. ICIP 2001. Thessaloniki, Greece, Oct. 7-10, 2001, International Conference on Image Processing, New York, NY: IEEE, US, vol. 2 of 3. Conf. 8, pp. 237-240, XP001045559.

Feig et al., "Computing Image Histogram from Compressed Data," SPIE 2898:118-124, (1996).

Hilton, "Wavelet and Wavelet Packet Compression of Electrocardiograms," Technologic Report TR9505, Department of Computer Science, The University of South Carolina, Columbia, pp. 1-12, (1997).

Kalifa et al., "Minimax Restoration and Deconvolution," Name of Pub., pp. 1-25, (2003).

Mallat, "A Theory of Multiresolution Signal Decomposition: The Wavelet Representation," IEEE Transactions on Pattern Analysis and Machine Intelligence, 11:674-693, 1989.

Mallat et al., "Analysis of Low Bit Rate Image Transform Coding," IEEE Transactions on Signal Processing, 46:1027-1042, 1998.

Mandal et al., "Fast Wavelet Histogram Techniques for Image Indexing," School of Information Technology and Engineering, University of Ottawa, Ottawa, Canada, pp. 1-15, (1999).

Mertins, :Image Compression via Edge-Based Wavelet Transform, University of Wollongong, Australia, pp. 1-21, (1999).

Pennec et al., "Image Compression with Geometrical Wavelets," IEEE, pp. 661-664, 2000.

Smith et al., "Exact Reconstruction Techniques for Tree-Structures Subband Coders," IEEE Transactions on Acoustics, Speech and Signal Processing ASSP:34:434-441, 1986.

Starck et al., "The Curvelet Transform for Image Denoising," IEEE Transactions on Image Processing, 11:670-684, 2002.

Starck et al., "Very High Quality Image Restoration by Combining Wavelets and Curvelets," Wavelets: Applicationsin Signal and Image Processing IX, San Diego, CA, ISA, Jul. 30-a Aug. 2001, 4478:9-19, XP002244432.

Thevenaz et al., "Interpolation Revisited," IEEE Transactions on Medical Imaging, 19:739-758, 2000.

Xu et al., Three-Dimensional Embedded Subband Coding with Optimized Truncation (#-D ESCOT): Applied and Computational Harmonic Analysis, 10:290-315,2001.

* cited by examiner

PROCESSING OR COMPRESSING N-DIMENSIONAL SIGNALS WITH WARPED WAVELET PACKETS AND BANDELETS

CROSS-REFERENCE TO RELATED APPLICATIONS

This application is a divisional of U.S. patent application Ser. No. 10/539,684, which is a 371 national phase of PCT/EP2002/014903 filed on Dec. 17, 2002. The content of these applications is hereby incorporated by reference in its entirety.

BACKGROUND OF INVENTION

The invention relates generally to a n-dimensional signal processing method, apparatus and computer program, and in particular to a method, apparatus and computer program useful for processing n-dimensional signals, such as one-dimensional signals, two-dimensional images or three-dimensional data or video image sequences.

The invention is particularly pertinent to the field of signal data processing and compression. Signal compression is a process which encodes signals for storage or transmission over a communication channel, with fewer bits than what is used by the uncoded signal. The goal is to reduce the amount of degradation introduced by such an encoding, for a given data rate. The invention is also relevant to signal restoration or feature extraction for pattern recognition.

In signal processing, efficient procedures often require to compute a stable signal representation which provides precise signal approximations with few non-zero coefficients. Signal compression applications are then implemented with quantization and entropy coding procedures. At high compression rates, it has been shown in S. Mallat and F. Falzon, "Analysis of low bit rate image transform coding," IEEE Trans. Signal Processing, vol. 46, pp. 1027-1042, 1998, that the efficiency of a compression algorithm essentially depends upon the ability to construct a precise signal approximation from few non-zero coefficients in the representation.

The stability requirement of the signal representation has motivated the use of bases and in particular orthogonal bases. The signal is then represented by its inner products with the different vectors of the basis. A sparse representation is obtained by setting to zero the coefficients of smallest amplitude. During the last twenty years, different signal representations have been constructed, with fast procedures which decompose the signal in a separable basis. Block transforms and in particular block cosine bases have found important applications in signal and image processing. The JPEG still image coding standard is an application which quantizes and Huffman encodes the block cosine coefficients of an image. More recently, separable wavelet bases which compute local image variations at different scales, have been shown to provide a sparser image representation, which therefore improves the applications. These bases are particular instances of wavelet packet bases, in R. Coifman, Y. Meyer, M. Wickerhauser, "Method and apparatus for encoding and decoding using wavelet-packets", U.S. Pat. No. 5,526,299. The JPEG image compression standard has been replaced by the JPEG-2000 standard which quantizes and encodes the image coefficients in a separable wavelet basis: "JPEG 2000, ISO/IEC 15444-1:2000," 2000. Wavelet and wavelet packet bases are also used to compress one-dimensional signals, including medical signals such as electro-cardiogram (ECG) recordings, as in M. Hilton, J. Xu, Z. Xiong, "Wavelet and wavelet packet compression of electrocardiograms", IEEE Trans. Biomed. Eng., vol. 44, pp. 394-402, May 1997. Decomposition in three dimensional wavelet bases are also used in video image compression, in S. Li and Y-Q. Zhang, in "Three-Dimensional Embedded Subband Coding with Optimized Truncation (3-D ESCOT)", Applied and Computational Harmonic Analysis 10, 290-315 (2001), where a video sequence is decomposed with three dimensional wavelet transform performed along motion threads in time.

Signal restoration of sparse signal representations has been developed by thresholding the wavelet coefficients of noisy signals in D. Donoho and I. Johnstone, "Ideal spatial adaptation via wavelet shrinkage," Biometrika, vol. 81, pp. 425-455, December 1994. Applications of wavelet packet bases to deconvolution of signals are also presented in J. Kalifa, S. Mallat, "Minimax restoration and deconvolution", in Bayesian inference in wavelet based models, ed. P. Muller and B. Vidakovic, Springer-Verlag, 1999. Constructing sparse representations is also important to extract features for pattern recognition. This has important applications to content based signal indexing and retrieval from digital multimedia libraries and databases. Feature vectors using histograms of wavelet coefficients are used in M. K. Mandal and T. Aboulnasr, "Fast wavelet histogram techniques for image indexing", Computer Vision and Image Understanding, vol. 75, no. 1/2, pp. 99-110, August 1999.

The main limitation of bases such as block cosine bases, wavelet bases or more generally wavelet packet bases, currently used for signal representation, is that these bases are composed of vectors having a fixed geometry which is not adapted to the geometry of signal structures. For one-dimensional signals such as ECG, which are quasi-periodic, adapting the basis to the varying period allows one to take advantage of the redundancy due to the existence of a periodicity in the signal. In images, edges often correspond to piece-wise regular curves which are therefore geometrically regular. In higher dimensional signals such as video sequences, edges and singularities often belong to manifolds that are also geometrically regular. Constructing bases that take advantage of this geometrical regularity can considerably improve the efficiency of signal representations and hence improve applications such as compression, restoration and feature extraction.

In E. Le Pennec and S. Mallat, "Method and apparatus for processing or compressing n-dimensional signals by foveal filtering along trajectories", U.S. patent application Ser. No. 09/834,587, filed Apr. 13, 2001, and in E. Le Pennec, S. Mallat, "Image Compression with Geometrical Wavelets", Proceedings of International Conf. on Image Processing, Vancouver, September 2000, part of the signal information is represented with wavelet foveal filters that follow foveal trajectories adapted to the geometry of the signal. The wavelet foveal coefficients are then decorrelated with linear operators that compute bandelet coefficients. The edgeprint representation of Dragottia and Vetterli, in "Footprints and edgeprints for image denoising and compression", Proceedings of the International Conference on Image Processing, Thessaloniki, October 2001, use a similar strategy with footprint wavelet vectors that follow edges computed from the image. Foveal bandelets and edgeprints do not provide a complete signal representation, and it is therefore necessary to incorporate a residual signal to reconstruct the original signal, which is a source of inefficiency for data compression and restoration applications.

Accordingly, there exists a need in the art for improving signal processing, by computing sparse representations by taking advantage of the signal geometrical regularity, from which one can reconstruct precise signal approximations with fast and numerically stable procedures and apply it to signal compression, restoration and pattern recognition.

SUMMARY OF THE INVENTION

It is a primary object of this invention to devise a method and means to construct a sparse and stable warped wavelet packet representation of n-dimensional signals by taking advantage of the regularity of their geometrical structures. A further object is to a compute bandelet representation from the warped wavelet packet representation, with an efficient bandeletisation adapted to the signal geometry. It is yet another object of this invention to build a system that compresses signals by quantizing and encoding the coefficients of this sparse bandelet representation. Another object of this invention is to restore signals by processing the coefficients of this bandelet representation. Another object of this invention is to use the bandelet representation for signal feature extraction for pattern recognition systems.

The invention includes a warped wavelet packet processor that computes an n-dimensional warped wavelet packet transform including warped wavelet packet coefficients and wavelet packet warping grids, from an n-dimensional digital input signal, wherein n is a positive integer. It comprises the steps of providing an n-dimensional warped signal including n-dimensional warped coefficients and n-dimensional signal warping grids; and computing said warped wavelet packet transform of said warped signal, with a binary tree where each node performs a one-dimensional warped subband processing along a particular dimension d, with $1 \leq d \leq n$. In dimension $n \geq 2$, said warped subband processing have a phase alignment coherent with said signal warping grids.

The invention also includes an inverse warped wavelet packet processor that computes an n-dimensional digital output signal from an n-dimensional warped wavelet packet transform. It comprises the steps of: computing a warped signal including n-dimensional warped coefficients and n-dimensional signal warping grids, from said n-dimensional warped wavelet packet transform, with a binary tree where each node performs a one-dimensional inverse warped subband processing along a particular dimension d, with $1 \leq d \leq n$; and computing said digital output signal from said warped signal with an inverse signal warping. The sampling grid of the output signal is identical to the sampling grid of the input signal.

As opposed to prior art wavelet packet processors, as in R. Coifman, Y. Meyer, M. Wickerhauser, "Method and apparatus for encoding and decoding using wavelet-packets", U.S. Pat. No. 5,526,299, or to J. Li, S. M. Lei, "Arbitrary shape wavelet transform with phase alignment", U.S. Pat. No. 6,233,357, or to A. Mertins, "Image compression via edge-based wavelet transform," Opt. Eng., vol. 38, no. 6, pp. 991-1000, 1999, the subband filtering is not performed on the input signal sampling grid, but on different sampling grids, called warping grids, that are typically adapted to the geometrical signal properties in different regions. As opposed to the subband filtering used in the wavelet packet procedures referenced above, a warped subband filtering is not computed with a convolution operator but with space varying filters, in order to handle the nonuniform structure of the warping grids. For three-dimensional video image sequences, as opposed to 3D-ESCOT method in J. Xu, Z. Xiong, S. Li and Y-Q. Zhang, "Three-Dimensional Embedded Subband Coding with Optimized Truncation (3-D ESCOT)", Applied and Computational Harmonic Analysis 10, 290-315 (2001), the warping grid regions are not reduced to motion threads in time, and the warped subband processing satisfies a phase alignment constraint coherent with the warping grids, which is not satisfied by the 3D-ESCOT method. With this phase alignment property, warped wavelet packet coefficients have the same geometrical regularity as the input signal. This is particularly interesting when a bandeletisation module is located downstream of the warped wavelet packet processor.

To adapt the signal representation to the geometrical signal structures, the invention comprises a geometrical sampling module that computes said signal warping grids from a set of parameters called a warping geometry. The warping grids are typically computed to follow the directions in which the signal has regular geometrical variations. In an exemplary implementation, the warping geometry includes region parameters that specify a partition of the signal support into several regions, and includes deformation parameters that define a geometrical deformation function which specify the position of sampling points in each of said region. The signal support is divided into regions in which the signal has typically uniform geometrical properties so that one can adapt the warping grid to all structures in the region. For signals that are nearly periodic, the warping grid can adapt the sampling interval to the varying period, to obtain a nearly exactly periodic signal, which is taken advantage of, by the subsequent bandeletisation module.

Warped wavelet packet coefficients are computed with warping grids that typically follow directions in which the signals has regular variations. Because of the phase alignment property of warped subband processors, warped wavelet packet coefficients inherit the regularity of the signal in these directions. The invention preferably includes a bandeletisation module that yields a sparse representation by decorrelating said warped wavelet packet coefficients, by applying invertible one-dimensional linear operators along selected directions of said warped wavelet packet coefficients. For regions in which the signal is nearly periodic along particular directions, the bandeletisation module performs a periodic decorrelation, that takes advantage of the redundancy introduced by the existence of a quasi-periodicity. The resulting bandelet coefficients are decomposition coefficients in a basis composed of warped bandelet vectors. The one-dimensional linear decorrelation operators, can be chosen to be a cosine transform or a one-dimensional wavelet packet trans-form or a warped wavelet packet transform. The n-dimensional signal is then represented by its bandelet coefficients and the parameters of the warping geometry that specify the warping grids in each signal region.

The invention also includes an inverse bandeletisation module that computes an n-dimensional warped wavelet packet transform from a warping geometry and bandelet coefficients. It comprises the steps of computing wavelet packet warping grids from said warping geometry, and computing warped wavelet packet coefficients by applying inverse one-dimensional linear operators along selected directions on said bandelet coefficients.

As opposed to the method in E. Le Pennec and S. Mallat, in "Method and apparatus for processing or compressing n-dimensional signals by foveal filtering along trajectories", U.S. patent application Ser. No. 09/834,587, filed Apr. 13, 2001, and in E. Le Pennec, S. Mallat, "Image Compression with Geometrical Wavelets", Proceedings of International Conf. on Image Processing, Vancouver, September 2000, bandelet coefficients are not computed from foveal coefficients but from warped wavelet packet coefficients. As a consequence, no residual signal is needed to reconstruct a precise signal approximation from bandelets of warped wavelets as opposed to the above referenced method.

Signal processing procedures are efficiently implemented in a warped wavelet packet bandelet representation because of the ability to provide sparse and accurate representations by setting their smallest coefficients to zero. The invention comprises a processor compressing n-dimensional signals that quantizes the bandelet coefficients and encodes these quantized bandelet coefficients with the warping geometry to obtain a multiplexed data stream suitable for storage in a storage medium or for transmission over a transmission medium. The invention also comprises a processor that restores an input signal by applying a restoration processor on the bandelet coefficients and the warping geometry to compute an output signal from these restored coefficients. The invention also comprises a processor that computes a signal feature vector from the warping geometry and bandelet coefficients, for pattern recognition applications including content based signal indexing or retrieval and signal matching.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

Figure 1:
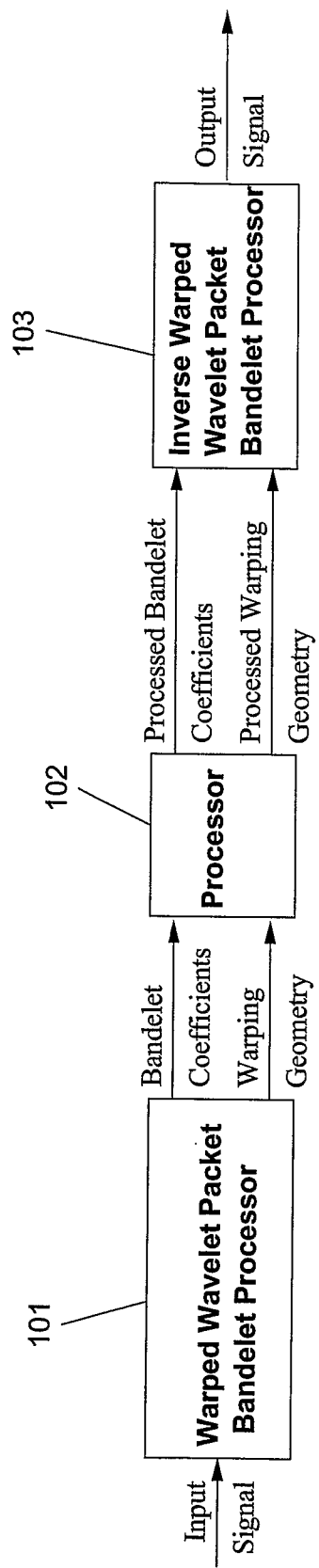
FIG. 1 shows, in block diagram form, an exemplary embodiment of the invention which computes a warped wavelet packet bandelet representation of an input n-dimensional signal, processes this representation and reconstructs an output n-dimensional signal.

FIG. 1 shows a system exemplifying the present invention. The system takes in input an n-dimensional digitized signal, where n is a positive integer. The digitized signal is given by an n-dimensional array of sample values. Electrocardiograms (ECGs) are examples of a 1-dimensional signal, images are examples of 2-dimensional signals, and video image sequences are examples of 3-dimensional signals. The warped wavelet packet bandelet processor (101) computes from an input signal a warping geometry adapted to the input signal, as well as bandelet coefficients that are inner products with a family of bandelet vectors adapted to the signal geometry. The processor (102) transforms the bandelet coefficients and the warping geometry according to a particular application such as signal restoration. In a transmission system, the processor may compress and code the warping geometry together with the bandelet coefficients into a bitstream, which is transmitted along a transmission medium, and decoded, to output processed bandelet coefficients and a processed geometry. The inverse warped wavelet packet bandelet processor (103) takes in input the processed warping geometry and the processed bandelet coefficients and computes an output signal.

Figure 2:
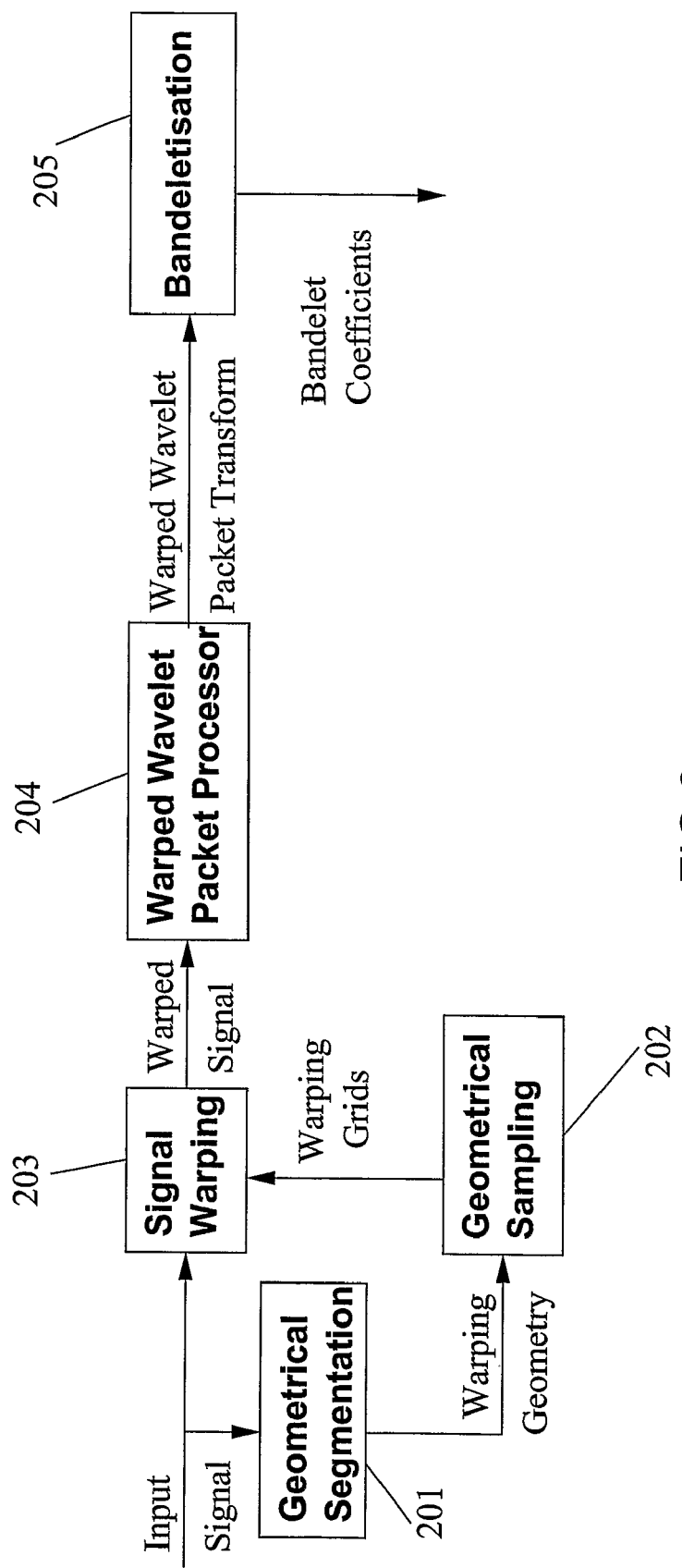
FIG. 2 shows, in block diagram form, an exemplary configuration of a warped wavelet packet bandelet processor.

FIG. 2 shows, in block diagram form, an exemplary configuration of the warped wavelet packet bandelet processor (101). A geometrical segmentation module (201) computes from the input signal a warping geometry which includes parameters from which the geometrical sampling module (202) computes a list of signal warping grids. A signal warping grid is an array of points that are distributed according to the geometrical signal properties in a given region. The signal warping processor (203) computes from the input signal and the signal warping grids a list of warped coefficients that stores the signal values at the locations of all points of all warping grids. The output warped signal is composed of the warped coefficients together with the signal warping grids. The warped wavelet packet processor (204) computes a warped wavelet packet transform that includes warped wavelet packet coefficients and wavelet packet warping grids. The bandeletisation processor (205) decorrelates the input warped wavelet packet coefficients by applying one-dimensional linear invertible operators along selected directions of the warped wavelet packet coefficient arrays. It outputs bandelet coefficients.

Figure 3:
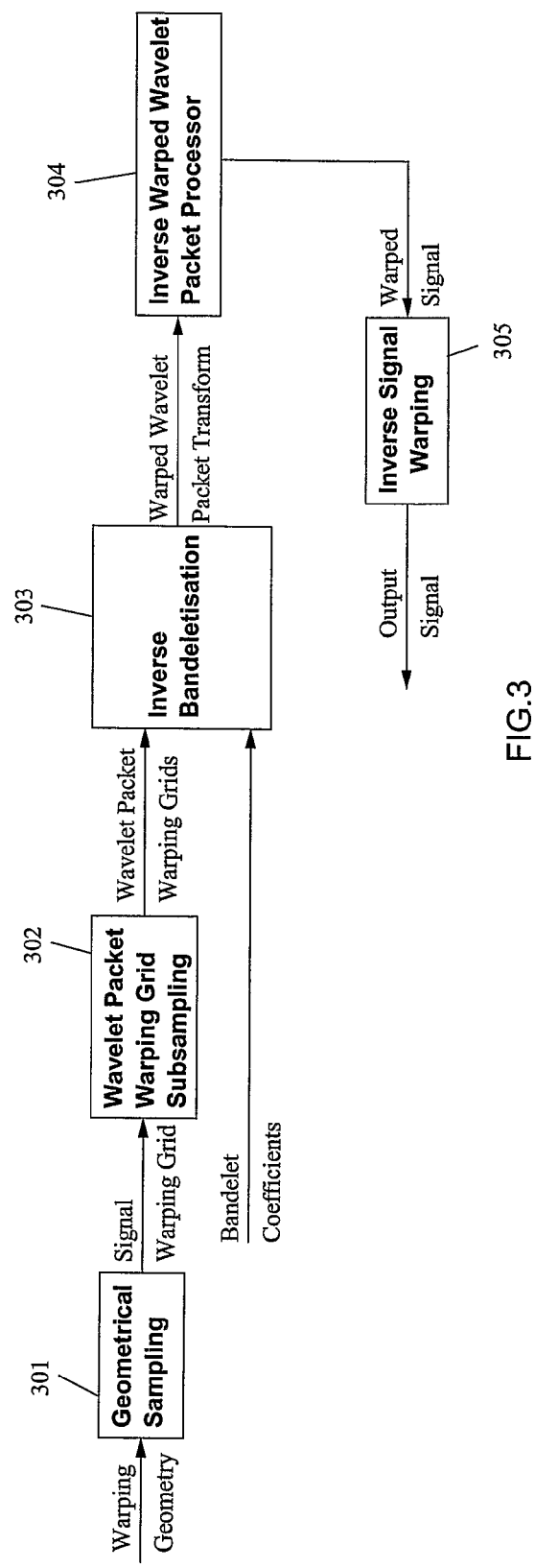
FIG. 3 shows, in block diagram form, an exemplary configuration of an inverse warped wavelet packet bandelet processor.

FIG. 3 shows, in block diagram form, an exemplary configuration of the inverse warped wavelet packet bandelet processor (103). The geometrical sampling (301) computes signal warping grids from an input warping geometry. The wavelet packet warping grid subsampling (302) computes wavelet packet warping grids from the signal warping grids. The inverse bandeletisation (303) implements the inverse of the bandeletisation (205). It inputs the wavelet packet warping grids and bandelet coefficients and outputs a warped wavelet packet transform including warped wavelet packet coefficients and the corresponding wavelet packet warping grids. The inverse warped wavelet packet processing applied by processor (304) implements the inverse of the warped wavelet packet processor (204): from the input wavelet packet transform, it computes a warped signal including warped coefficients and the signal warping grids. The inverse signal warping (305) recovers an output signal defined over the same sampling grid as the input signal in FIG. 2, with an interpolation procedure.

In an exemplary embodiment of the present invention, each process can be carried out by a computer program. The computer program is run on a computing device which may comprise a storage device such as a magnetic disk or an optical disk on which the n-dimensional digital input signal may be stored. The n-dimensional digital input signal may also have been received by the computing device after a transmission via a network connection such as an ethernet link, a phone line, a wireless transmission, etc. The computer program can be stored on the storage device, on a Read Only Memory (ROM), or other type of non-transitory computer readable media. Each process is executed by a Central Processing Unit (CPU) coupled to a Random Access Memory (RAM). The output of each process can be stored on the storage device or transmitted via a network connection. In another exemplary embodiment, each process can be carried out by a dedicated electronic device comprising the instructions to implement said process.

Warping Grids and Warping Geometry

The input n-dimensional discrete signal in FIG. 2 is specified by an array of samples S(m) where $m=(m_1, \ldots, m_n)$ is an n-dimensional index parameter and each $m_d$ is an integer for $1 \leq d \leq n$. The position of these samples is represented by the point of coordinates $m=(m_1, \ldots, m_n)$ in $\mathbb{R}^n$. The signal support $S_s$ in $\mathbb{R}^n$ is the halo of all $m \in \mathbb{Z}^n$ for which the signal value is defined. The halo($\mathcal{M}$) of a subset $\mathcal{M}$ of $\mathbb{Z}^n$ is the subset of $\mathbb{R}^n$ defined by a union of hypercubes:

$$\text{halo}(\mathcal{M}) = \bigcup_{m \in \mathcal{M}} [m_1 - 1/2, m_1 + 1/2] \times \ldots \times [m_n - 1/2, m_n + 1/2]$$

To manipulate multidimensional indexes of arrays, the following notations are used. For any integer a and any positive integer b, there exists a unique pair (q, r) of a quotient and a remainder such that:

$$a = bq + r$$

where $r \in \{0, \ldots, b-1\}$ (Euclidean division). We define the 'mod' and 'div' operators by a mod b=r and a div b=q. For any $k=(k_1, \ldots, k_n) \in \mathbb{Z}^n$, we write:

$$k \bmod_d 2 = k_d \bmod 2$$

$$k \operatorname{div}_d 2 = (k_1, \ldots, k_{d-1}, k_d \operatorname{div} 2, k_{d+1}, \ldots, k_n)$$

$$2_d k = (k_1, \ldots, k_{d-1}, \ldots, k_n)$$

$$k/2_d = (k_1, \ldots, k_{d-1}, k_d/2, k_{d+1}, \ldots, k_n)$$

and $1_d = (0, \ldots, 0, 1, 0, \ldots, 0)$ is a unit displacement along direction d: the coordinate d is equal to 1 and all others are equal to 0. For any $x \in \mathbb{R}^n$ and $r \in (0, +\infty)$ we also write $$\|x\|_r = \left( \sum_{d=1}^n |x_d|^r \right)^{1/r}$$

for $r < \infty$ $$\|x\|_\infty = \max_{d=1 \ldots n} |x_d|.$$

When x and u are two vectors of $\mathbb{R}^m$, for some m>0, we write $x \cdot u = \sum_{d=1}^m x_d u_d$ the inner product between two vectors x and u. When A is a matrix of any size of entries $a_{ij}$, $A^T$ is the conjugate transpose matrix, of entries $a_{ji}^*$, and $A^{-T}$ is a shorter notation for $(A^T)^{-1}$.

The warped wavelet packet transform is computed along a union of sampling grids called warping grids. The union of the warping grids is typically not equal to the signal sampling grid and is adapted to the geometrical structure of the signal. In an exemplary embodiment, each warping grid is represented by an array of points $WG(i, k) \in \mathbb{R}^n$ where i is a fixed index and $k \in \mathbb{Z}^n$ is a position index. For a fixed region index i, the warping grid WG(i, k) is only defined for a subset of values of k, and corresponds to a region $\mathcal{R}_i$ of the input signal support, over which the input signal has a homogeneous geometrical structure. Any other state of the art representation of arrays of sampling points may be used. The warping geometry includes parameters calculated from the n-dimensional input signal by the geometrical segmentation module (201), that characterize the warping grids which are computed by the geometrical sampling module (202) from the warping grids.

In an exemplary implementation, the warping geometry specifies a partition of $S_S$ into regions $\mathcal{R}_i \subset \mathbb{R}^n$, with $S_S \cup_i \mathcal{R}_i$, and specifies a geometrical deformation $$\delta_i(k) = (\delta_{i,1}(k), \ldots, \delta_{i,n}(k)) \in \mathbb{R}^n$$

whose support is the set of $k \in \mathbb{Z}^n$ such that $\delta_i(k) \in \mathcal{R}_i$. For each region $\mathcal{R}_i$, the geometrical sampling module (202) computes a signal warping grid $$WG(i, k) = \begin{cases} \delta_i(k) & \text{if } \delta_i(k) \in \mathcal{R}_i \\ \text{nil} & \text{otherwise.} \end{cases} \quad (1)$$

The warping geometry also specifies a regularity descriptor RegWG(i) which is a vector $(p_1, \ldots, p_n)$ that characterizes the regularity of the signal samples along the different directions of the warping grid WG(i, k). Along each direction d, if $p_d=0$ then for k fixed, WC(i, k+l$1_d$) can have irregular variations as a function of l. If $p_d=0$ then WG(i, k+lp$_d 1_d$) has regular variations as a function of l. Thus, $p_d=1$ indicates that the function WC(i, k+l$1_d$) of l is slowly varying, whereas $p_d>1$ indicates that the function WC(i, k+l$1_d$) of l is nearly periodic of period $p_d$. The vector RegWG is stored together with the warping grids WG and is used by the bandeletisation processor (205) to perform an appropriate decorrelation of warped wavelet packet coefficients. The geometrical segmentation module represents the partition into regions $\mathcal{R}_i$ with region parameters, the geometrical deformations $\delta_i(k)$ with deformation parameters, and the vector RegWG(i) with vector parameters, from which $\mathcal{R}_i$, $\delta_i(k)$ and RegWG(i) can be recovered. To compute the warping grids with (1), the geometrical sampling module (202) first recovers for each i, $\mathcal{R}_i$, $\delta_i(k)$ and RegWG(i) by inverting these operators. The following gives exemplary embodiments to compute the warping geometry from an n-dimensional signal. These embodiments are not limitative and any state of the art technique may be used to compute a warping geometry from which one can compute warping grids.

In an exemplary embodiment, each region $\mathcal{R}_i$ is the halo in $\mathbb{R}^n$ of $\mathcal{R}_i \cap \mathbb{Z}^n$, and is specified by a binary membership map for all $k \in \mathbb{Z}^n b_i(k)=1$ if $k \in \mathcal{R}_i$ and $b_i(k)=0$ otherwise, Any state of the art parameterization technique may be used to represent these binary maps, including a chain coding of their boundary. In yet another exemplary embodiment, a segmentation is calculated with a parameterized modification such as a linear warping in $\mathbb{R}^n$ of a predefined segmentation, in order to adapt the segmentation to the signal. The region parameters then include only the modification parameters such as the parameters of the linear warping operator. For images of human faces, a state of the art technique may be used to detect features such as the eyes. We then compute the affine warping which renormalizes the position of these features and use this affine warping to adapt a predefined segmentation of the face into regions adapted to the geometrical face structures. In yet another exemplary embodiment of the geometrical segmentation (201), each region $\mathcal{R}_i$ is a parametrized geometrical shape such as a hyperrectangle or an ellipsoid in $\mathbb{R}^n$ in which case the deformation parameters can include their center $(c_1, \ldots, c_n)$, and their widths $(w_1, \ldots, w_n)$ along each of the n direction, or $\mathcal{R}_i$ may be a union of such geometrical shapes.

In an exemplary embodiment, the signal support is divided into hyperrectangle regions $\mathcal{R}_i$ that are dyadic hypercubes of width equal to w $2^j$ with $j \leq 0$, where w is a fixed integer parameter. In an exemplary embodiment, this partition is computed with averaged orientation vector with a splitting procedure. The signal gradient is a vector $\Delta S(m) = (\Delta_1 S(m_1, m_2), \ldots, \Delta_n S(m_1, m_2))$ computed at each point $m \in \mathbb{Z}^n \cap S_S$ with:

$$\Delta_d S(m) = S(m) - S(m - 1_d) \text{ for } 1 \leq d \leq n.$$

For any $u \in \mathbb{R}^n$ we define the average gradient energy over a region $\mathcal{M}$, in the direction of u by:

$$C_\mathcal{M}(u) = \sum_{m \in \mathcal{M}} |\nabla S(m) \cdot u|^2. \quad (2)$$

The average orientation is defined as the unit vector in $\mathbb{R}^n$ that minimizes C(u):

$$u_\mathcal{M} = \arg\min_{\|u\|=1} C(u).$$

We calculate the n by n matrix $\overline{Q}\mathcal{M}$ whose coefficients are the averages for $m \in \mathcal{M}$ of the coefficients of the n by n matrix $Q\mathcal{M}(m) = \Delta S(m)\Delta S(m)^T$. Since $C(u) = u^T \overline{Q}\mathcal{M}u$, the vector $u\mathcal{M}$ is a unit norm eigenvector of $\overline{Q}\mathcal{M}$ corresponding to the minimum eigenvalue which is equal to $u_\mathcal{M}^T \overline{Q}\mathcal{M}u\mathcal{M} = C\mathcal{M}(u\mathcal{M})$. This value measures the signal regularity in the most regular direction over $\mathcal{M}$.

Figure 4:
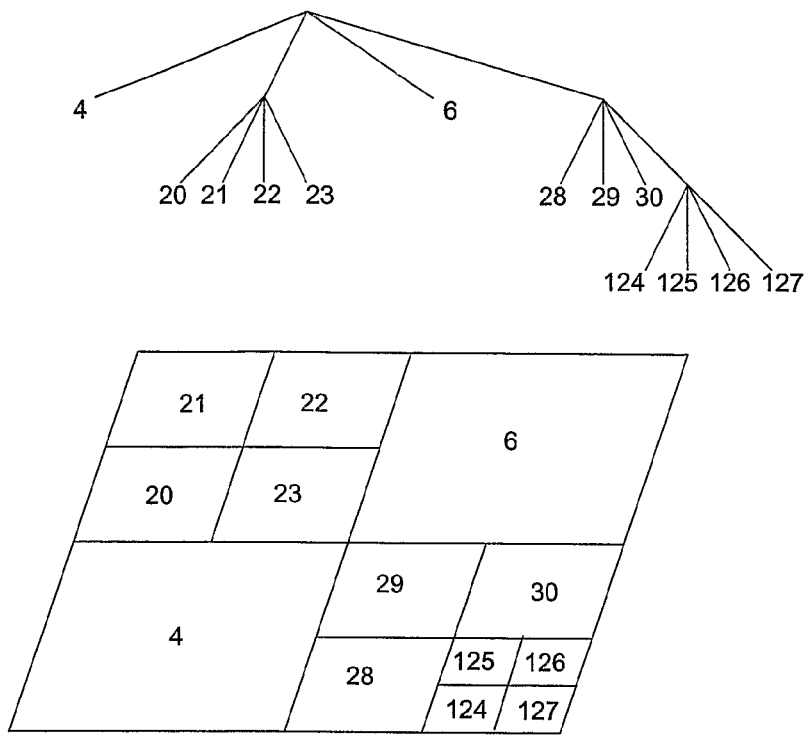
FIG. 4 illustrates the partition of an image support in dyadic square regions and its quad-tree representation.

The recursive splitting procedure Split($\mathcal{R}$) is defined over any hypercube $\mathcal{R}$ and initially applied to the whole signal support $\mathcal{R}_1 = S_S$. For any i, Split($\mathcal{R}_i$) computes the average orientation $u_i$ in $\mathcal{M}_i = \mathcal{R}_i \cap \mathbb{Z}^n$. Let $T_1$ be a parameter and $C_i = u_i^T \overline{Q}\mathcal{M}_i u_i$. If $C_i > T_1$ then the square region $\mathcal{R}_i$ is divided into a partition of $2^n$ hypercubes of twice smaller width $\mathcal{R}_{2n_{i+2^n-1}}$). $\mathcal{R}_{2n_{i+1}} \ldots$, and $\mathcal{R}_{2n_{i+2^n-1}}$, and Split($\mathcal{R}_i$) recursively computes Split($\mathcal{R}_{2n_i}$) ... Split($\mathcal{R}_{2n_{i+2^n-1}}$). If $C_i \leq T_1$ then Split($\mathcal{R}_i$) returns the region index i, which is the index of the leaf corresponding to $\mathcal{R}_i$ in a tree representation of the partition. In this tree, called $2^n$-tree, any inside node has $2^n$ children. The region parameters of the warping geometry parameterizes the tree corresponding to the signal support segmentation with a state of the art representation of a $2^n$-tree. In yet another exemplary embodiment, the region partition is further modified with a merging procedure that yield a segmentation into regions that are unions of hypercubes. Adjacent hypercube regions are merged using a criterion similar to the splitting criterion above: whenever the minimum eigenvalue of $\overline{Q}\mathcal{M}$ is smaller than a fixed threshold $T_2$, where $\mathcal{M}$ is the union of two region grids $\mathcal{M}_{i_1} = \mathcal{R}_{i_1} \cap \mathbb{Z}^n$ and $\mathcal{M}_{i_2} = \mathcal{R}_{i_2} \cap \mathbb{Z}^n$, the two adjacent regions $i_1$ and $i_2$ are merged. The region parameters then includes parameters specifying this merging. In dimension n=2, the partition is represented by a quad-tree, as illustrated in FIG. 4. The square image support is subdivided into four equal square regions. The lower left square is not subdivided and corresponds to the leaf 4 of the quad-tree above. The upper left square is subdivided in four squares corresponding to the leaves 20, 21, 22, 23 of the quad-tree. In an example of a region merging procedure, regions 20 and 21 are merged together into a single region, and regions 6, 30 and 126 are also merged together.

In dimension n=3, in yet another exemplary embodiment of the geometrical segmentation (201), the regions $\mathcal{R}_i$ are 3-dimensional rectangles, of fixed width w along one of the direction, say $x_3$, and whose projections on the plane $(x_1, x_2)$ are dyadic squares that define a partition of the signal support, which is represented by a quad-tree. This quad-tree can be calculated with a splitting procedure similar to the quad-tree splitting procedure for n=2, using average gradient energy measurements over each of the 3-dimensional rectangles specified by a square in the plane $(x_1, x_2)$ and a width w along $x_3$.

Directional geometrical deformations are exemplary embodiments of geometrical deformations $\delta_i(k) = (\delta_{i,1}(k), \ldots, \delta_{i,n}(k))$ that can have n+1 different directions. The direction 0 corresponds to a grid parallel to $\mathbb{Z}^n$ for which $\delta_i(k) = k + c_i$, where $c_i$ is a constant vector. For any $1 \leq d \leq n$, a geometrical deformation along direction d satisfies $\delta_{i,1}(k) = k_l + c_{i,l}$ for $l \neq d$ and $\delta_{i,d}(k) = k_d + i_{i,d}(k_1, \ldots, k_{d-1}, k_{d+1}, k_n)$ In an exemplary embodiment, the constants $c_{i,l}$ for $l \neq d$ are chosen to depend only upon the geometry of each region $\mathcal{R}_i$ and their value do not need to be stored. It may be minus the minimum coordinate in the direction l among all points in $\mathcal{R}_i$. Any state of the art parameterization technique may be used to define the deformation parameters that specify the function $c_{i,d}$. In an exemplary embodiment, deformation parameters are decomposition coefficients of $c_{i,d}(k_1, \ldots, k_{d-1}, k_{d+1}, k_n)$ in a basis such as a wavelet basis or a block cosine basis defined over the set of parameter indexes $(k_1, k_{d-1}, k_{d+1}, k_n)$ from which there exists $k_d$ such that $(k_1 + c_{i,1}, \ldots, k_{d-1} + c_{i,d-1}, k_d, k_{d+1} + c_{i,d+1}, \ldots, k_n + c_{i,n}) \in \mathcal{R}_i$. Fast transforms as described in S. Mallat, "A wavelet tour of signal processing", Academic Press, 1998, can be used to compute these decomposition coefficients.

In an exemplary embodiment, for each regions $\mathcal{R}_i$ of a signal partition, the deformation direction is computed by finding the direction in which the signal is the most irregular. It is done by calculating the matrix $\overline{Q}\mathcal{R}_i$ previously defined. If the trace of $\overline{Q}\mathcal{R}_i$ is smaller than an adjustable parameter $T_2$ then the region is uniformly regular, in which case the geometrical deformation has the direction 0 and RegWG(i)=(1, 1, ..., 1). Otherwise the direction in which the signal is the most irregular, is defined as the direction d such that $$1_d^T \overline{Q}\mathcal{R}_i 1_d = \max_{1 \leq l \leq n} 1_l^T \overline{Q}\mathcal{R}_i 1_l.$$

The regularity descriptor RegWG(i)=$(p_1, p_2, \ldots, p_n)$ is then defined by $p_l = 1$ for each $l \neq d$ and $p_d = 0$. We shall see that the value $p_d = 0$ can later be updated if there exist quasi-periodic variations along the direction d.

In dimension n=2, a directional geometrical deformation in the direction 1 can be written $$\delta_i(k)=(k_1+c_{i,1}(k_2),k_2+c_{i,2})$$

and in the direction 2

$$\delta_i(k)=(k_1+c_{i,1},k_2+c_{i,2}(k_1)).$$

In an exemplary embodiment, the geometrical deformation over each region is also calculated from average orientation vectors. Let us consider a region whose deformation direction is d=2, the other case d=1 being treated similarly. For each $l \in \mathbb{Z}$ let $\mathcal{R}_{i,l}$ be the set of integers $m_2$ such that $(l, m_2) \in \mathcal{R}_i$. The first parameter of the geometrical deformation $c_{i,1}$ is an integer that is set to 0. To compute $c_{i,2}(k_1)$, we compute the average orientation vector $u_i(l)=(u_{i,1}(l),u_{i,2}(l))$ over $\mathcal{R}_{i,l}$. Let a be the minimum of all integers l such that $\mathcal{R}_{i,l} \neq \emptyset$. We define $$\tilde{c}_{i,2}(m_1) = \sum_{l=a}^{m_1} \frac{u_{i,2}(l)}{u_{i,1}(l)}.$$

The discrete signal $\bar{c}_{i,2}(m_1)$ is then decomposed over a basis such as a discrete wavelet basis or a discrete cosine basis with a linear operator. To obtain a sparse parameterization, in an exemplary embodiment, all decomposition coefficients of $\bar{c}_{i,2}(m_1)$ of amplitude below a threshold $T_3$ are set to zero. For compression applications, in yet another exemplary embodiment, the decomposition coefficients of $\bar{c}_{i,2}(m_1)$ are quantized by a scalar quantization. We define $c_{i,2}(m_1)$ as the signal reconstructed by applying the inverse linear operator on the thresholded or quantized coefficients of $\bar{c}_{i,2}(m_1)$. The deformation parameters of the warping geometry specify the direction d=2 and the thresholded or quantized decomposition coefficients used to compute $c_{i,2}(k_1)$. An equivalent procedure computes the geometrical deformation in the direction d=1.

In yet another exemplary embodiment, in any region $\mathcal{R}_i \subset \mathbb{R}^n$, a directional geometrical deformation is computed in dimension n in a direction $1 \leq d \leq n$ by detecting local maxima of the gradient. The signal gradient $\Delta S(k)$ is calculated at each $k \in \mathbb{Z}^n \cap S_S$. For any $p \neq d$ we set $\delta_{i,p}(k)=k_p$. For any fixed $(k_1, \ldots, k_{d-1}, k_{d+1}, \ldots, k_n)$ we consider the set of all l such that $(k_1, \ldots, k_{d-1}, l, k_{d+1}, \ldots, k_n) \in \mathcal{R}_i$ and if this set is not empty, we find in this set the integer $k_d$ such that $|\Delta S(k)|^2$ is maximum in k $(k_1, \ldots, k_{d-1}, k_d, k_{d+1}, \ldots, k_n)$ and define $$\tilde{c}_{i,d}(k_1, \ldots, k_{d-1}, k_{d+1}, \ldots, k_n) = k_d$$

We decompose $\tilde{c}_{i,d}$ in a discrete basis such as a wavelet basis in dimension n−1 and threshold its coefficients or quantize its coefficients and denote by $c_{i,d}(k_1, \ldots, k_{d-1}, k_{d+1}, \ldots, k_n)$ the hypersurface reconstructed from the thresholded or quantized coefficients of $\tilde{c}_{i,d}$. The deformation parameters specify the direction d and the thresholded or quantized decomposition coefficients used to compute $c_{i,2}(k_1)$.

For an input video image sequence, which is an n=3 dimensional signal, in yet another exemplary embodiment, the warping grid segmentation module (201) computes a directional geometric deformation by applying a time displacement to a 2-dimensional geometrical deformation using estimated motion vectors. The video sequence is written $S(m_1, m_2, m_3)$ where $m_3$ is the time parameter, and for a fixed $m_3=l$, $S(m_1, m_2, l)$ is an image. For any region $\mathcal{R}_i$ and $m_3=l$ fixed, let $\mathcal{R}_{i,l}$ be the image region of all $(m_1, m_2)$ such that $(m_1, m_2, l) \in \mathcal{R}_i$. To a three-dimensional region $\mathcal{R}_i$, we associate a spatial geometrical deformation $(c_{i,1}(k_1, k_2), c_{i,2}(k_1, k_2))$, and a two-dimensional regularity descriptor $(p_1, p_2)$ which indicates the spatial direction in which the signal is regular. Let a be the minimum l for which $\mathcal{R}_{i,l} \neq \emptyset$. In an exemplary embodiment, the said spatial geometrical deformation and two dimensional regularity descriptor $(p_1, p_2)$ are provided by computing a two-dimensional directional geometrical deformation in the slice $\mathcal{R}_{i,a}$. We define RegWG=$(p_1, p_2, 1)$ which indicates that the variations in time are regular. For any l for which $\mathcal{R}_{i,l}$ is not empty, an average motion vector is computed over $\mathcal{R}_{i,l}$ by calculating the average displacement of the signal components in this region with respect to their position in the previous image $S(m_1, m_2, l-1)$. Any state of the art motion estimation algorithm may be used, including matching procedures or gradient based computations. Let $v_i(l)=(v_{i,1}(l), v_{i,2}(l))$ be the average motion vector of the region $\mathcal{R}_{i,l}$ and $$(\tilde{w}_{i,1}(m_3), \tilde{w}_{i,2}(m_3)) = \sum_{l=a}^{m_3} v_i(l).$$

In an exemplary embodiment, a sparse parameterization is obtained by decomposing this displacement vector in a basis, thresholding or quantizing the decomposition coefficients and reconstructing an approximate displacement vector $(w_{i,1}(m_3), w_{i,2}(m_3))$ from the quantized or thresholded coefficients. Deformation parameters include these thresholded or quantized decomposition coefficients. The motion geometric deformation is then defined by $$\delta_i(k)=(c_{i,1}(k_1,k_2)+w_{i,1}(k_3), c_{i,2}(k_1,k_2)+w_{i,2}(k_3), k_3)$$

The geometrical segmentation module (201) can also detect the existence of quasi-periodic signal variations, measures these quasi-periods to adapt the warping grid in each region. We shall first consider the case of an input one-dimensional signal and then describe an exemplary embodiment for n-dimensional signals.

For a one-dimensional signal $S(m)$, the geometrical segmentation processor divides the signal support $S_S$ into intervals $[a_i, a_{i+1}-1]$, in which either the signal is quasi-periodic, with quasi-periods that have a bounded relative variation, or in which the signal has no quasi-periodicity. The value of RegWG(i) is used to indicate what is the nature of the signal in each interval. RegWG(i)=0 indicates that S is not quasi-periodic over $[a_i, a_{i+1}-1]$, in which case the geometric deformation mapping is simply $\delta_i(k)=k+c_i$ for some integer $c_i$. RegWG(i)=$2^l$ for some integer l indicates that S is quasi-periodic inside $[a_i, a_{i+1}-1]$ the varying period being close to $2^l$. In a particular embodiment, the time-varying period in $[a_i, a_{i+1}-1]$ is defined from $J_i$ consecutive period measurements $P_i(j)$ for $1 \leq j \leq J_i$ with $\sum_{j=1}^{J_i} P_i(j) = a_{i+1}-1-a_i$. To obtain a warping grid WG(i, k) such that the corresponding warped signal WC(i, k) has a quasi-period equal to $2^l$, the geometrical deformation $\delta_i(k)$ is chosen to be a mapping from an interval $[0, J_i 2^l]$ to $[a_i, a_{i+1}-1]$ that maps 0 to $a_i$ and each $j2^l$ to $a_i-P_i(1)+\ldots+P_i(j)$. Let $b_0=a_i$ and $b_j=a_i+P_i(1)+\ldots+P_i(j)$ for all j in $\{1, \ldots, J_i\}$. We set $\delta_i(j2^l)=b_j$ for $j=0, \ldots, J_i$ and intermediate values $\delta_i(k)$ for $k \neq j2^l$ are calculated with any state of the art interpolation procedure such as the piecewise linear one:

$$\forall k \in [j2^l+1, (j+1)2^l-1], \delta_i(k)=b_j+(b_{j+1}-b_j) \times (2^{-l}k-j).$$

Any state of the art periodic detection procedure may be used to segment the signal support and compute quasi-periods $P_i(j)$ in each interval. In an exemplary embodiment, the periodicity is measured with a variogram, defined over $[0, L]$ and for any $(m, p) \in \mathbb{Z}^2$:

$$V(m, p) = \sum_{l=0}^{L} |S(m+l) - S(m+p+l)|. \qquad (3)$$

Period values are estimated in a predefined range $[P_{min}, P_{max}]$. An admissible period computed from reference point m is defined as the minimum $p > P_{min}$ with $p < P_{max}$ such that $V(m, p) < T$ where T is a fixed threshold. If such a p does not exist then S(m) is considered as non-periodic on $[m, m+P_{max}]$.

We suppose that the signal support $S_S$ is an interval and cut iteratively this interval into regions $[a_i, a_{i+1}-1]$, by constructing iteratively the sequence $(a_i)_i$. The sequence is initialized by setting $a_I$ to be the first point of $S_S$. At each iteration, a value $a_i$ has been determined and we compute the next value $a_{i+1}$ as follows.

If the variogram (3) indicates that S is not periodic on $[a_i, a_i+P_{max}]$, i.e. there is no admissible period from reference point $m = a_i$, then RegWG(i)=0. We find the minimum integer q for which when $m = a_i q P_{max}+1$ the variogram (3) finds an admissible period p from reference point $m = a_i + q P_{max}+1$ and we set $a_{i+1} = m-1$.

If the variogram (3) finds an admissible period p computed from reference point $m = a_i$ then we set RegWG(i)=$2^l$ where l is the closest integer to $\log_2(p)$. We set $\tilde{P}_i(1) = p$, $b_0 = a_i$, $b_1 = a_i + \overline{P}_i(1)$ and compute iteratively the next values of $b_q$, for $q>1$ as follows. We suppose that $b_q$ has been computed. Every time the variogram (3) finds an admissible period p from reference point $m = b_q$, and if $\max(2^l, p)/\min(2^l, p) < T_4$ where $T_4$ is a fixed threshold then we set $\overline{P}_i(q+1) = p$ and $b_{q+1} = b_q + p$. This is continued until the variogram (3) does not find an admissible period p from some reference point $m = b_{J_i}$ or if it finds a period p such that $\max(2^l, p)/\min(2^l, p) \geq T_4$. The quasi-period sequence $\tilde{P}_i(j)$ for $1 \leq k \leq K_i$ is considered as a signal that decomposed in a basis and whose decomposition coefficients are thresholded or quantized. We write $P_i(j)$ the sequence reconstructed from these thresholded or quantized decomposition coefficients. We then set $a_{i+1} = a_i + \sum_{j=1}^{J_i} P_i(j)$.

This progressive construction of intervals $[a_i, a_{i+1}-1]$ continues until we reach the end of the support $S_S$. In an exemplary embodiment, the region and deformation parameters of the warping geometry specify for each interval the size $2^l$, the number of quasi-periods $J_i$, and the thresholded or quantized decomposition coefficients used to compute the quasi-period sequence $P_i(j)$. When the signal is not periodic in $[a_i, a_{i+1}-1]$, the length $P_i(1) = a_{i+1} - a_i$ is stored. Since $a_{i+1} = a_i \Sigma_{j=1}^{J_i} P_i(j)$ the interval boundaries are recovered from these parameters.

We now consider for $n>1$ an n-dimensional signal S(m) whose support $S_S$ has been partitioned into regions $\mathcal{R}_i$ over which a geometrical deformation $\delta_i(k)$ was calculated together with RegWG(i)=$(p_1, \ldots, p_n)$ with $p_j=1$ or $p_j=0$. Several exemplary embodiments were described to compute such a partition. When the correlation type RegWG(i) of a region i is such that $p_d=0$ for a single direction d, an exemplary embodiment of the geometrical segmentation module (201) scans the signal in region i along the direction d for which $p_d=0$, and if there exists some quasi-periodicity along the samples of the warping grid defined by $\delta_i(k)$, it further divides $\mathcal{R}_i$ according to these quasi-periodicity. The quasi-periodicity is measured with a variogram in the direction d, with a similar strategy as the exemplary embodiment described for n=1 dimensional signals. This leads to new sub-regions $\mathcal{R}_{i,j}$ inside each of which a new geometric deformation further modifies the geometrical deformation $\delta_i(k)$ so that the resulting warping grid has a quasi-periodicity of fixed size $2^l$ along the direction d, and we replace the d-th component of RegWG(i, j)=$(p_1, \ldots, p_n)$ with $p_d=2^l$. When the number of directions d such that $p_d=0$ is higher than 1, a similar periodicity scanning and segmentation is performed, wherein the periodicity scanning from a reference point consists in finding a family of independent period vectors by minimizing a variogram function, and wherein the periodicity scanning is performed along the samples of the warping grid defined by $\delta_i(k)$ along the axes for which $p_d=0$. After proper modification of the geometrical deformation function $\delta(i, k)$, the signal is quasi-periodic of period $2^{l_d}$ along some directions d of the warping grid defined by $\delta(i, k)$, and for these directions the vector RegWG(i) is updated by replacing its d-th coordinate previously equal to 0 with $2^{l_d}$.

Signal Warping and Inverse Warping

The signal warping processor (203) computes a value WC(i, k) of the signal at each warping grid points WG(i, k)≠nil, given the input signal sample values S(m). This calculation can be performed with any state of the art interpolation procedure. The output warped signal includes the warped coefficients WC(i, k) together with the signal warping grid WG(i, k).

An exemplary embodiment is obtained by computing the interpolation with an interpolation function $\phi(x)$ for $x \in \mathbb{R}^n$ which satisfies $\phi(0)=1$ and $\phi(m)=0$ for $m \in \mathbb{Z}^n$ and $m \neq 0$. At any location WG(i, k)=x≠nil, the interpolated coefficients are then $$WC(i, k) = \sum_{m \in S_S \cap \mathbb{Z}^n} S(m)\phi(x - m). \qquad (4)$$

An example of an interpolation function $\phi(x)$ is a separable function $$\phi(x_1, \ldots, x_n) = \phi_0(x_1) \ldots \phi_0(x_n), \qquad (5)$$

where $\phi_0(t)$ is an interpolation function with $\phi_0(0)=1$ and $\phi_0(m)=0$ for $m \in \mathbb{Z}$ and in $m \neq 0$. In an exemplary embodiment, an interpolation procedure such as described in P. Thévenaz, T. Blu, M. Unser, "Interpolation Revisited," IEEE Transactions on Medical Imaging, vol. 19, no. 7, pp. 739-758, July 2000, is used to compute WC(i, k). State of the art techniques are used to adapt the interpolation kernel at the boundary of $S_S$.

The inverse signal warping processor (305) in FIG. 3 takes in input a warped signal including the signal warping grids $WG_1$ and warped coefficients $WC_1$ at the corresponding locations, and computes the output signal that is written $S_o(m)$ defined for all $m \in \mathbb{Z}^n$ in the support $S_S$ of the input signal in FIG. 2. The operation it performs is an approximation of the inverse of the interpolation implemented by the signal warping processor (203). The output signal can be calculated with any state of the art interpolation procedure. An exemplary embodiment of this interpolation is calculated as follows. For each $m \in \mathbb{Z}^n \cap S_S$, we find the warping grid point WG($i_m$, $k_m$)=x that has a minimum distance d(x, m) where d may be any distance such as the Euclidean distance. The value $S_o(m)$ is computed by finding local coordinates c of m in the warping grid WG(i, k) and performing an interpolation with a uniform metric in this warping grid. In an exemplary embodiment, for each direction $1 \leq d \leq n$, we find among the two neighbors WG($i_m$, $k_m \pm 1_d$) the one WG($i_m$, k, $_m + \epsilon_d 1_d$) with $\epsilon_d=1$ or $-1$ that is the closest to m. The local coordinates $c=(c_1, \ldots, c_n)$ are then defined as the sums of the coordinates of $k_m$ and the coordinates of the vector $m-WG(i_m, k_m)$ in the basis of the n vectors $\epsilon_d(WG(i_m, k_m+\epsilon_d 1_d)-WG(i_m, k_m))$ for $1 \leq d \leq n$.

Given the local coordinate c of the point $m \in \mathbb{Z}^n$ in the warping grid $WG(i_m, k)$, in an exemplary embodiment, $S_o(m)$ is computed with an interpolation function $\phi(x)$ which satisfies $\phi(0)=1$ and $\phi(k)=0$ if $k \in \mathbb{Z}^n$. The interpolated coefficients are then given by $$S_o(m) = \sum_{k \in \mathbb{Z}^n} WC(i_m, k)\phi(c-k).$$

In a preferred embodiment, the interpolation function $\phi(x)$ is a separable function like in (5). State of the art techniques are used to adapt the interpolation kernel at the boundary of the warping grid $WG(i_m,k)$.

Warped Wavelet Packet Processor and Inverse

Figure 5:
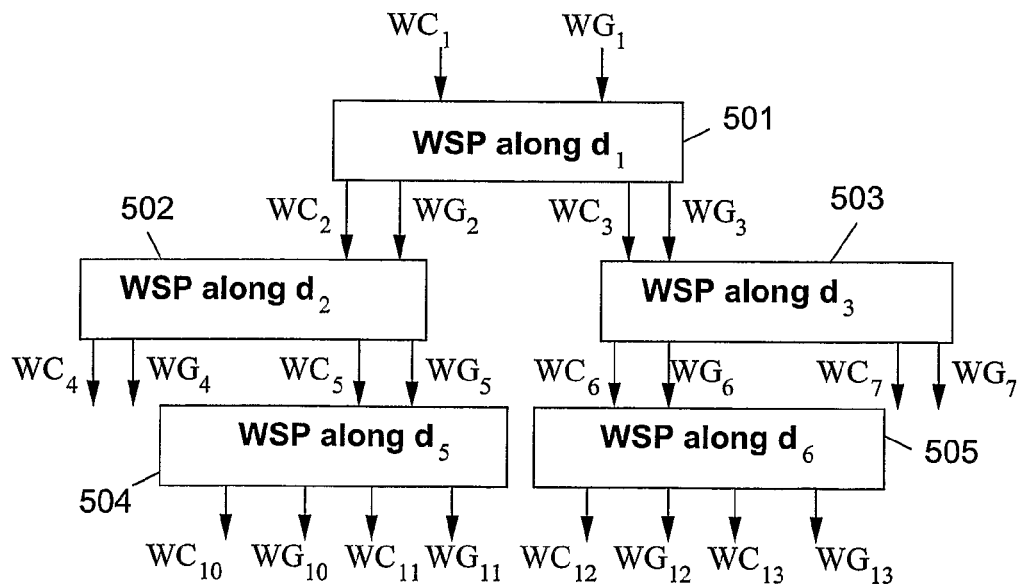
FIG. 5 shows, in block diagram form, an exemplary configuration of a warped wavelet packet binary tree that implements a warped wavelet packet processor.

The warped wavelet packet processor (204) computes a warped wavelet packet transform from the input warped signal, with a binary tree of one-dimensional warped subband processings. An exemplary embodiment of this binary tree is illustrated in FIG. 5. The input warped signal includes the warped coefficients $WC_1$ and the signal warping grids $WG_1$. Similarly to a tree-structured subband coder as in M. J. Smith and T. P. Barnwell III, "Exact reconstruction for tree-structured subband coders", IEEE Trans. Acoust., Speech and Signal Proc., vol. 34, no. 3, pp. 431-441, 1986, a warped wavelet packet transform is calculated with a binary tree of subband decompositions which splits the input signal into two signals which have the same total number of samples as the input signal, but in this case the subband decomposition is performed by a Warped Subband Processor (WSP) adapted to the warping grids that are typically different from the input signal sampling grid. This warped subband processor thus operates differently from a state of the art subband filtering procedure, as in S. Mallat, "A theory for multiresolution signal decomposition: the wavelet representation," IEEE Transaction on Pattern Analysis and Machine Intelligence, vol. 11, p. 674-693, July 1989. Each node of the binary tree is labeled by an integer p. At the root p=1. The left and right children of a node p are respectively labeled by the integers 2p and 2p+1. Each Warped Subband Processor (WSP) in (501), (502), (503), (504) and (505) performs a one-dimensional warped subband processing along the lines of the input warped coefficients in a direction $1 \leq d_p \leq n$, which can be chosen arbitrarily for each node p of the binary tree. At a node p, this warped subband processing splits the input warping grids $WG_p$ and the corresponding warped coefficients $WC_p$ into two sets of warping grids $WG_{2p}$ and $WG_{2p+1}$ and two sets of warped coefficients $WC_{2p}$ and $WC_{2p+1}$ defined over these grids. The warped coefficients $WC_{2p}$ are obtained with a warped subband filtering using a low-pass filter whereas the warped coefficients $WC_{2p+1}$ are obtained with a high-pass filter. The output warped wavelet packet transform corresponds to the family of warped coefficients $WC_p$ together with their warping grids $WG_p$, at the nodes $p \in P$ which are the leaves of the warped wavelet packet binary tree, In FIG. 5, it is composed of $WC_4$ and $WG_4$, $WC_7$ and $WG_7$, $WC_{10}$ and $WG_{10}$, $WC_{11}$ and $WG_{11}$, $WC_{12}$ and $WG_{12}$, $WC_{13}$ and $WG_{13}$, so P={4, 7, 10, 11, 12, 13} in this case.

Figure 6:
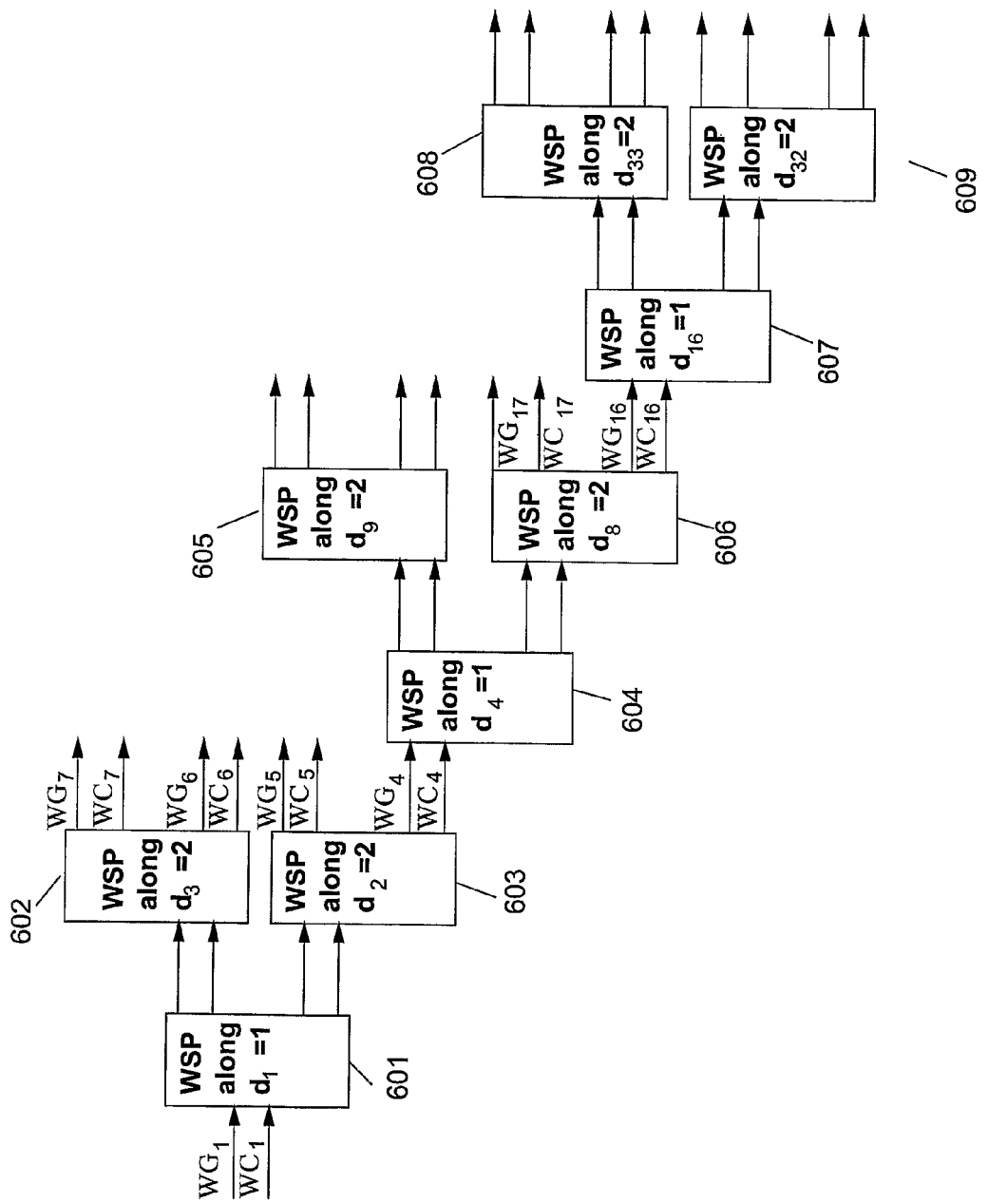
FIG. 6 shows, in block diagram form, a warped wavelet packet binary tree that implements a warped wavelet processor for n=2 dimensional signals, over 3 levels.

A warped wavelet processor is a particular embodiment of warped wavelet packet processor, corresponding to a specific binary tree. This binary tree is the same as the one used to compute a separable n-dimensional non-warped wavelet transform, as in S. Mallat, "A wavelet tour of signal processing", Academic Press, 1998. In dimension n=2, the binary tree is illustrated in FIG. 6. This binary tree is composed of WSP (Warped Subband Processor) (601-609) in directions $d_p=1$ if $2^k \leq p < 2^{k+1}$ with k even, and $d_p=2$ if $2^k \leq p < 2^{k+1}$ with k odd. After the first two levels of WSP decompositions in the binary tree, only the warped coefficients $WC_4$ and warping grids $WG_4$ are further processed. The same succession of warped subband processors in the directions d=1 and d=2 is then applied and only the output of the low-pass branch corresponding to $WC_p$ and $WG_p$ for $p=4^k$ is further sub-decomposed, as illustrated in FIG. 6. This binary tree of processors can be further continued on more levels.

Figure 7:
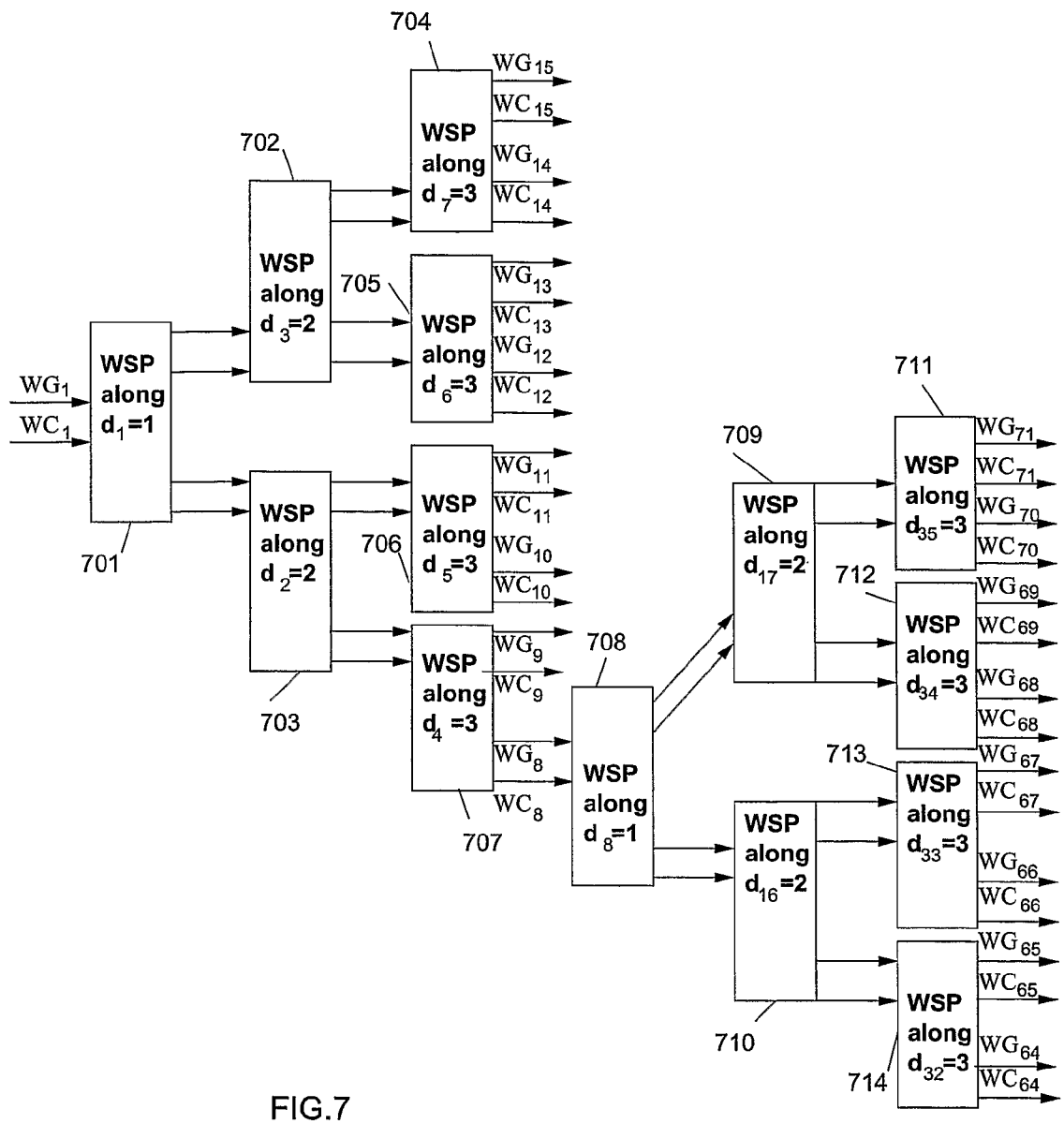
FIG. 7 shows, in block diagram form, a warped wavelet packet binary tree that implements a warped wavelet processor for n=3 dimensional signals, over 2 levels.

In dimension n=3, the binary tree of a warped wavelet processor is illustrated in FIG. 7. This binary tree is composed of WSP (701-714) in directions $d_p=1$ if $2^k \leq p < 2^{k+1}$ with k=0 mod 3, $d_p=2$ if $2^k \leq p < 2^{k+1}$ with k=1 mod 3, $d_p=3$ if $2^k \leq p < 2^{k+1}$ with k=2 mod 3. After three levels of WSP decompositions only the warped coefficients $WC_p$ and warping grids $WG_p$ with p=8k, obtained with a succession of low-pass subband warped filtering, are further processed, like $WC_8$ and $WG_8$ in FIG. 7.

Figure 8:
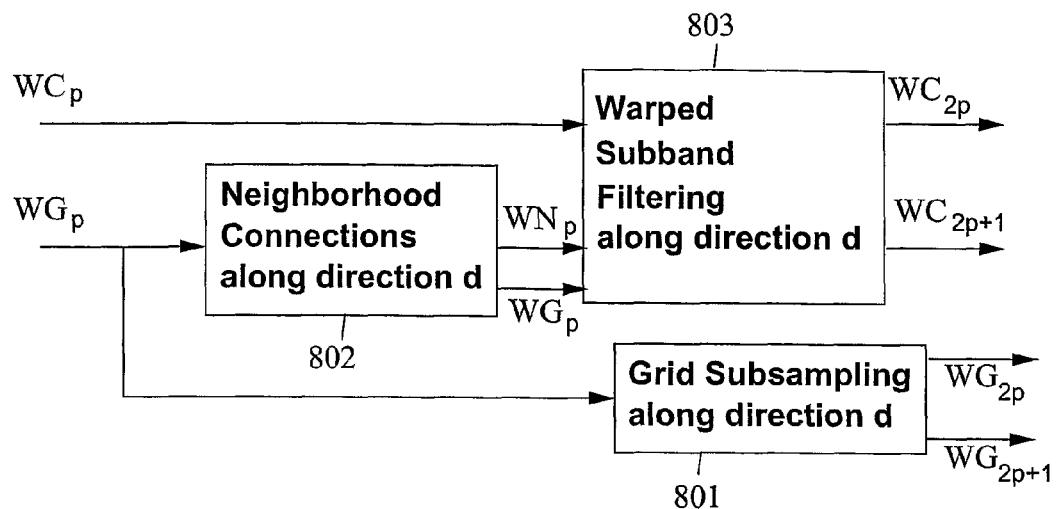
FIG. 8 shows, in block diagram form, an exemplary configuration of a Warped Subband Processor (WSP) along a direction d.

An exemplary configuration of a warped subband processor in a direction d is illustrated by the block diagram in FIG. 8. The grid subsampling along direction d performed by module (801) splits the warping grid $WG_p$ into two warping grids $WG_{2p}$ and $WG_{2p+1}$, by defining for all i and all k $$WG_{2p}(i, k) = WG_p(i, 2_d k) \text{ and } WG_{2p+1}(i, k) = WG_p(i, 2_d k + 1_d),$$

and $$RegWG_{2p}(i) = RegWG_{2p+1}(i) = RegWG_p(i)/2_d.$$

Note that in this last formula, the resulting vectors Reg $WG_{2p}(i)$ and $RegWG_{2p+1}(i)$ may have non integer entries, like ½ or ¼. In the description of the present invention, warping grids $WG_p$ corresponding to separate nodes of the wavelet packet binary tree are considered as stored in separate arrays, to simplify the explanations, but can also be stored in a single array.

If the warped wavelet packet transform is done individually within each grid, when reconstructing an output signal from processed warped coefficients, it creates discontinuities at the grid boundaries. To avoid this effect, the warped wavelet packet processor performs the subband filtering across warping grids. Grid connections are computed by the neighborhood connection processor (802), which establishes neighborhood connections between boundary points of different regions along the direction d. A warped subband filtering processor (803) along direction d takes in input warped wavelet coefficients $WC_p$ with the corresponding warping grids $WG_p$ and a neighborhood connection graph $WN_p(i, k, \Delta, d)$ along direction d and performs a subband filtering within each grid of coefficients $WC_p(i, k)$ and across grids, with adapted filters. It outputs the subband warped coefficients $WC_{2p}$ and $WC_{2p+i}$.

The neighborhood connection processor (802) establishes a neighborhood relation which is symmetric, meaning that if a first point is a left neighbor of a second point then the second point is the right neighbor of the first point. In an exemplary embodiment, for each $WG_p(i, k) \neq nil$, $WN_p(i, k, -1, d) = (i_l, k_l)$ gives the index $i_l$ of the region where the left neighbor of $WG_p(i, k)$ in the direction d is located and $k_l$ is its index in this region. Similarly, $WN_p(i, k, 1, d) = (i_r, k_r)$ gives the index $i_r$ of the region where the right neighbor of (i, k) in the direction d is located and $k_r$ is its index in this region. The computation of $WN_p(i, k, \pm 1, d)$ proceeds as follows: if $WG_p(i, k - 1_d) \neq nil$ then $WN_p(i, k, -1, d)$ is set equal to $(i, k-1_d)$, and otherwise (i, k) is included in the Right list that stores the indexes of all points that do not have a left neighbor in the same region. Similarly, if $WG_p(i, k+1_d) \neq nil$ then $WN_p(i, k, 1, d)$ is set equal to $(i, k+1_d)$, and otherwise $(i, k)$ is included in the Left list that includes the indexes of all points that do not have a right neighbor in the same region.

For all $(i, k)$ in the Right list we search for a left neighbor point $(i', k')$ in the Left list, with $i' \neq i$ and which minimizes $Cost(WG_p(i', k'), WG_p(i, k))$, where $Cost(x, x')$ is a cost function defined over pairs of points in $\mathbb{R}^{n}$. We then set $WN_p(i, k, -1, d) = (i', k')$. Similarly, for all the points $(i, k)$ in the Left list we search for a right neighbor point $(i', k')$ in the Right list, with $i' \neq i$, which minimizes $Cost(WG_p(i, k), WG_p(i', k'))$ and set $WN_p(i, k, 1, d) = (i', k')$. To guarantee that the neighborhood connection graph is symmetrical, i.e. that $$WN_p(i,k,1,d)=(i',k') \Leftrightarrow WN_p(i',k',-1,d)=(i,k)$$

for each point $(i, k)$ of the Left list, if $WN_p(i, k, 1, d) = (i', k')$ and $WN_p(i', k', -1, d) \neq (i, k)$ we set $WN_p(i, k, 1, d) = nil$, which means that it has no right neighbor. Similarly, for each point $(i,k)$ of the Right list, if $WN_p(i, k, -1, d) = (i', k')$ and $WN_p(i', k', 1, d) \neq (i, k)$ we set $WN_p(i, k, -1, d) = nil$.

A first example of cost function is derived from a norm in $\mathbb{R}^{n}$ for some $r > 0$ $$Cost(WG_p(i,k), WG_p(i',k')) = \|WG_p(i,k) - WG_p(i',k')\|_r$$

A second example computes a distance after translating the point in the Left list by a prediction vector $\tau_{i,k}$ in the direction d $$Cost(WG_p(i,k), WG_p(i',k')) = \|WG_p(i,k) + \tau_{i,k} - WG_p(i',k')\|_r$$

where we may choose $\tau_{i,k} = WG_p(i, k) - WG_p(i, k-1_d)$. Any other cost function may be used to compute the neighborhood connection graph $WN_p$.

The warped subband filtering processor (803) performs a one-dimensional subband filtering of the warped coefficients $WC_p$ along the direction d, across the different grids, through the connections $WN_p$ of the warping grids $WG_p$ and outputs $WC_{2p}$ and $WC_{2p+1}$. The inverse aligned subband filtering processor (903) in FIG. 9 implements the inverse by reconstructing $WC_p$ from $WC_{2p}$ and $WC_{2p+1}$, given $WG_p$ and $WN_p$. The detailed implementation of both processors is thus described together.

A state of the art one-dimensional uniform subband filtering is computed with a Finite Impulse Response low-pass filter H and an FIR high pass filter G, which admit a dual pair of FIR reconstruction filters $\tilde{H}$ and $\tilde{G}$, as described in S. Mallat, "A wavelet tour of signal processing", Academic Press, 1998. The subband decomposition performs a filtering with H and G of $WC_p(i, k)$ along the direction d and subsamples the output on even index points within each grid.

Let $S_H$ and $S_G$ be the finite support of the filters $H(l)$ and $G(l)$ for $l \in \mathbb{Z}$. If $(i, k)$ satisfies $$\forall l \in S_H \text{ and } \forall l \in S_G \ WG_p(i, 2_d k + l1_d) \neq nil \quad (6)$$

then a state of the art uniform subband filtering along the direction d computes:

$$WC_{2p}(i, k) = \sum_{l \in S_H} H(l) WC_p(i, 2_d k + l1_d) \quad (7)$$

and $$WC_{2p+1}(i, k) = \sum_{l \in S_G} G(l) WC_p(i, 2_d k + l1_d). \quad (8)$$

For $k = (k_1, \ldots, k_d, \ldots, k_n)$ we write $S_{\tilde{H}} + k_d$ and $S_{\tilde{G}} + k_d$ the support of $\tilde{H}$ and $\tilde{G}$ translated by $k_d$. The reconstruction is calculated with:

$$WC_p(i, k) = \sum_{2l \in S_{\tilde{H}} + k_d} \tilde{H}(2l - k_d) WC_{2p}(i, k - l1_d) + \quad (9)$$

$$\sum_{2l \in S_{\tilde{G}} + k_d} \tilde{G}(2l - k_d) WC_{2p+1}(i, k - l1_d). \quad (10)$$

For signals of dimension $n \geq 2$, a phase aligned subband filtering computes $WC_{2p}$ and $WC_{2p+1}$ from $WC_p$ so that for all $(i, k)$ which satisfy (6) the equality (7) and (8) are satisfied. The subband filtering processor (803) is then said to have a phase alignment coherent with the signal warping grids. To maintain this phase alignment property within each grid i, the subband filtering processor (803) adapts the filtering at the interface between warping grids. The inverse warped subband filtering processor (903) computes the inverse subband filtering (9) within each grid i and adapts the inverse filtering at the interface between warping grids. For signals of dimension $n = 1$, the warped subband filtering processor (803) does not necessarily maintain the phase alignment property, which means that local shift may be introduced when calculating the warped coefficients.

In an exemplary implementation, the one-dimensional subband filtering along d is performed by the processors (803) and (903), by decomposing $WG_p$ as a union of connected lines along the direction d, as follows. In both processors, we traverse $WN_p$ to build an array $Begin(q) = (i, k)$ corresponding to grid points that do not have a left neighbor, which means that $WN_p(i, k, -1, d) = nil$. Each line indexed by q is initialized with $L_q(0) = Begin(q)$ if k $mod_d$ 2=0 and $L_q(1) = Begin(q)$ if k $mod_d$ 2=1. Then for any $m \geq 0$ we iteratively compute the right neighbor of $L_q(m) = (i, k)$ and set $L_q(m+1) = WN_p(i, k, 1, d)$ and stop when it is nil. For each q fixed, we compute (7) and (8), with a direct subband filtering of $L_q$.

We maintain the phase alignment property by imposing that even samples of $L_q$ correspond to even samples of the grids $WG_p(i, k)$ along the direction d: if $(i, k) = L_p(m)$ then k $mod_d$ 2=m mod 2. To enforce this property, points are inserted with the following procedure. Because of our initialization procedure, the first point $L_q(0)$ or $L_q(1)$ satisfies this alignment property. Then we traverse $L_q$ and insert a new point with a special symbol Insert when the phase alignment is not respected. For all $m \geq 1$, if $(i, k) = L_q(m)$ and k $mod_d$ 2$\neq$m mod 2 then for all $l \geq m$ the entry $L_q(l)$ is shifted to $L_q(l+1)$ and we set $L_q(m) = Insert$, until the end of the line where $L_q(m) = nil$. In dimension $n = 1$, not maintaining the phase alignment property for the processors (803) and (903) means not inserting new points along each line $L_q(m)$, in which case we may have $(i, k) = L_p(m)$ and k $mod_d$ 2$\neq$m mod 2.

To implement the processor (803) the warped coefficients values $WC_p(i, k)$ along the line $L_q(m)$ are stored in $C_q(m)$. If $L_q(m) \neq nil$ and $L_q(m) \neq Insert$ then $C_q(m) = WC_p(L_q(m))$. If $L_q(m) = (i, k)$ is a point sufficiently far from the grid boundary and satisfies (6) then the values $C_q(m)$ are filtered with the same procedure as in (7) and (8). Otherwise, the filters are adapted to the interface between the connected grids to guarantee the perfect reconstruction property. In an exemplary implementation, the connecting filters are implemented by inserting new samples at grid connections where $L_q(m) = Insert$ and using these inserted values in a filtering scheme using the same filters H and G. Each inserted value $C_q(m)$ is expressed in terms of all other values $C_q(l)$, including other inserted coefficients, with linear interpolation coefficients $I_m(l)$. Let $N(q)$ be the number of inserted values where $L_q(m)=$ Insert along a line $L_q$. We call $S_q$ the set of indexes in such that $L_q(m) \neq$ nil and $S_{i,q}$ the set of indexes in such that $L_q(m)=$ Insert. The unknown value of all these inserted coefficients are calculated by solving the $N(q)$ by $N(q)$ linear system:

$$\forall m \in S_{i,q}, e(m) = \sum_{l \in S_q} I_m(l) C_q(l) = 0 \quad (11)$$

with $I_m(m)=-1$. If the linear system (11) does not have a unique solution, then we compute the vector of inserted coefficients $(C_q(m))_{m \in S_{i,q}}$ of minimum Euclidean norm which minimizes $\Sigma_{m \in S_{i,q}} |e(m)|^2$, with a singular value decomposition. In a preferred embodiment, $\Sigma_{l \in S_q} I_m(l)=0$ and the coefficients $I_m(l)$ are convolution kernel coefficients $I_m(l)=I(m-l)$, where border problems when defining $I_m$ for extreme values of m are solved with a state of the art technique. If $I(-l)=I(l)$, one may use a symmetric extension of $C_q(l)$ beyond its support. In an exemplary embodiment we choose $I(l)=\frac{1}{2}$ if $l=1$ and $l=-1$, and $I(l)=0$ if $|l|>1$. Since there is no consecutive inserted coefficients in $L_q(m)$ in this case the solution of (11) is computed explicitly by $$\forall m \in S_{i,q}, C_q(m) = \frac{1}{2}(C_q(m-1) + C_q(m+1)).$$

Warped subband coefficients are then calculated with a subband filtering of the line values:

$$D_q(2m) = \sum_{l \in S_H} H(l) C_q(2m + l) \quad (12)$$

and $$D_q(2m + 1) = \sum_{l \in S_G} G(l) C_q(2m + l). \quad (13)$$

Then values of $WC_{2p}$ and $WC_{2p+1}$ arrays are computed as follows: if $L_q(2m)=(i, k) \neq$ Insert then $WC_{2p}(i, k \, div_d \, 2)=D_q(2m)$ and if $L_q(2m+1)=(i, k)=$ Insert then $WC_{2p+1}(i, k \, div_d \, 2)=D_q(2m+1)$. Observe that the coefficients $D_q(m)$ corresponding to inserted coefficients, i.e. such that $L_q(m)=$ Insert, are discarded. If $(i, k)$ satisfies (6) then (12) and (13) give the same result as (7) and (8). State of the art boundary techniques explained for example in S. Mallat, "A wavelet tour of signal processing", Academic Press, 1998, such as symmetric procedures are used to solve boundary issues in the convolutions (12) and (13). In an exemplary implementation, these convolutions are computed with a state of the art lifting scheme as in I. Daubechies and W. Sweldens, "Factoring wavelet transforms into lifting steps", Jour. of Fourier Anal. Appl., Vol. 4, No. 3, pp. 245-267, 1998. In an exemplary implementation, the filters H and G are chosen to be the 7/9 Cohen, Daubechies, Feauveau filters specified in the above reference.

For a fixed q, let $M(q)$ be the size along m of the vectors $C_q(m)$ and $D_q(m)$ and $N(q)$ be the number of inserted values corresponding to $m \in S_{i,q}$. We denote by $O_q$ the linear operator from $\mathbb{R}^{M(q)}$ to $\mathbb{R}^{M(q)}$ which associates to any vector $C_q(m)$ the vector $D_q(m)$ with the filtering and subsampling formulas (12) and (13). The values of the line q in the direction d of the input $WC_p$ and of the outputs $WC_{2p}$ and $WC_{2p+1}$ are stored in the vectors $\overline{C}_q(m)$ and $\overline{D}_q(m)$ of size $M(q)-N(q)$, that equal respectively to $C_q(m)$ and $D_q(m)$ for all $m \in S_q-S_{i,q}$. Inserting coefficients according to (11), computing the coefficients $D_q(m)$ according to formulas (12) and (13) and then discarding coefficients $D_q(m)$ corresponding to inserted coefficients for indexes $m \in S_{i,q}$ defines an operator $\overline{O}_q$ from $\mathbb{R}^{M(q)-N(q)}$ to $\mathbb{R}^{M(q)-N(q)}$ that maps the vector $(C_q(m))_{m \in S_q-S_{i,q}}$ to $(D_q(m))_{m \in S_q-S_{i,q}}$. This linear operator $\overline{O}_q$ performs an adaptive filtering, with modified filter coefficients over the points $L_q(m)=(i, k)$ which do not satisfy (6). Any other state of the art implementation of $\overline{O}_q$, including a direct lifting scheme with no coefficient insertion, may be used to compute $\overline{D}_q(m)$ and hence each line q of $WC_{2p}$ and $WC_{2p+1}$.

The inverse processor (903), recovers the warped coefficients values $WC_p$ along each line $L_q(m)$ from the values of $WC_{2p}$ and $WC_{2p+1}$ along the corresponding lines. The vectors $\tilde{I}_m$ are defined by $\tilde{I}_m = O_q^{-T} I_m$. Their expression is then for indexes m away from the boundaries:

$$\tilde{I}_m(2r) = \sum_{l \in S_{\tilde{H}}} \tilde{H}(l) I_m(2r - l) \quad (14)$$

and $$\tilde{I}_m(2r + 1) = \sum_{l \in S_{\tilde{G}}} \tilde{G}(l) I_m(2r - l). \quad (15)$$

When the coefficients $I_m(l)$ are convolution kernel coefficients, the coefficients of $\tilde{I}_m(l)$ have a simple structure: $\tilde{I}_m(l) = \tilde{I}_0(l-m)$ for even m and $\tilde{I}_m(l) = \tilde{I}_1(l-m)$ for odd m, where $\tilde{I}_0$ and $\tilde{I}_1$ are two filters. This is not true near the boundaries, where the computation of $\tilde{I}_m = O_q^{-T} I_m$ is obtained by using appropriate boundary techniques when evaluating the sum (14) and (15), which are apparent to those skilled in the art Each array $D_q$ is defined for indexes $m \in S_q - S_{i,q}$ as follows: if $L_q(2m)=(i, k) \neq$ Insert then $D_q(2m)=WC_{2p}(i, k \, div_d \, 2)$ and if $L_q(2m+1)=(i, k) \neq$ Insert then $D_q(2m+1)=WC_{2p+1}(i, k \, div_d \, 2)$. To compute $D_q(m)$ for all $m \in S_{i,q}$ we solve the system of $N(q)$ linear equations with $N(q)$ unknowns:

$$\forall m \in S_{i,q}, \tilde{e}(m) = \sum_{l \in S_q} \tilde{I}_m(l) D_q(l) = 0. \quad (16)$$

If the linear system (16) does not have a unique solution, then we compute the vector of inserted coefficients $(D_q(m))_{m \in S_{i,q}}$ of minimum Euclidean norm which minimizes $\Sigma_{m \in S_{i,q}} |\tilde{e}(m)|^2$, with a singular value decomposition.

An inverse subband filtering is then applied on the line values $D_q(m)$. For all $l \in S_q - S_{i,q}$ $$C_q(l) = \sum_{2m \in l-S_{\tilde{H}}} \tilde{H}(l-2m) D_q(2m) + \sum_{2m \in l-S_{\tilde{G}}} \tilde{G}(l-2m) D_q(2m+1) \quad (17)$$

and $WC_p(L_q(m))=C_q(m)$. State of the art boundary techniques, as described in S. Mallat, "A wavelet tour of signal processing", Academic Press, 1998, such as symmetric procedures are used to solve boundary issues in the two convolutions (17). In an exemplary implementation, these convolutions are computed with a state of the art lifting scheme as in I. Daubechies and W. Sweldens, "Factoring wavelet transforms into lifting steps", Jour. of Fourier Anal. Appl., Vol. 4, No. 3, pp. 245-267, 1998. For each q, the insertion system

(16) together with (17) computes the inverse $\overline{O}_q^{-1}$ of the linear operator $\overline{O}_q^{-1}$ previously defined. Any other implementation of $\overline{O}_q^{-1}$ may be used, including a lifting scheme. In dimension n=1 if the phase alignment property is not maintained then there is no inserted coefficients and the system (16) is therefore not used.

In yet another implementation of the warped subband filtering processor (803) in direction d and its inverse (903), the subband filtering takes into account the fact that points in the sampling grids $WG_p(i, k)$ are irregularly spaced, using subband filtering on irregular point sets. In this embodiment, the position (abscissa) of each point of a line $L_q(m)$ is stored in $X_q(m)$. For all (q, m) with $L_q(m) \neq$ Insert and $L_q(m) \neq$ nil, we set $X_q(m) = WG_p(L_q(m)).1_d$, or any curvilinear abscissa defined along the polygonal line joining the points $(WG_p(L_q(m)))_{m \in S_q - S_{i,q}}$. If $m \in S_{i,q}$ then $$X_q(m) = \frac{1}{2}(X_q(m-1) + X_q(m+1))$$

and if $L_q(m)$=nil then $X_q(m)$=nil.

To implement the warped subband filtering processor (803), the value of $C_q(m)$ at the N(q) inserted positions where $L_q(m)$=Insert are calculated by solving an N(q) by N(q) linear system:

$$\forall m \in S_{i,q}, \sum_{l \in S_q} I_m(l) C_q(l) = 0 \quad (18)$$

with $I_m(m) = -1$. If this system does not have a single solution, the inserted values are calculated with a singular value decomposition as previously explained. For $l \neq m$, the values of $I_m(l)$ may depend upon m and be obtained by any state of the art interpolation kernel for irregular spaced samples located at positions $X_q(m)$, such as a Lagrange interpolation.

The low-pass and high-pass convolutions (12) and (13) are then replaced by a state of the art subband filtering procedure for irregular point sets. In an exemplary implementation, such a subband filtering, also called subdivision scheme, or one step wavelet transform, can be calculated with a lifting scheme, with any state of the art procedure such as the 1D subdivision in I. Daubechies, I. Guskov, P. Schroder and W. Sweldens, "Wavelets on irregular point sets", Phil. Trans. R. Soc. Lond. A., Vol. 357, No. 1760, pp. 2397-2413, 1999. For a fixed position $X_q(m)$ of the sample points, the irregular subband filtering operator that associates $D_q(m)$ to $C_q(m)$ is a linear operator that we also write $O_q$, i.e. $D_q = O_q C_q$.

In an exemplary implementation of the inverse warped subband filtering processor (903), the value of $D_q(m)$ for $m \in S_{i,q}$ are computed with the inverse kernel $\tilde{I}_m = O_q^{-T} I_m$, by solving the system $$\forall m \in S_{i,q}, \sum_{l \in S_q} \tilde{I}_m(l) D_q(l) = 0. \quad (19)$$

The solution is calculated with a singular value decomposition if the system does not have a unique solution. The inverse subband filtering operator $O_q^{-1}$ for irregular point sets is then applied on the line values $D_q(m)$ to recover $C_q(m)$. For all $m \in S_q - S_{i,q}$ we set $WC_p(L_q(m)) = C_q(m)$. The insertion system (19) together with $O_q^{-1}$ computes the inverse $\overline{O}_q^{-1}$ of the linear operator $\overline{O}_q$ previously defined. Any other implementation of $\overline{O}_q^{-1}$ may be used, including a lifting scheme.

Figure 10:
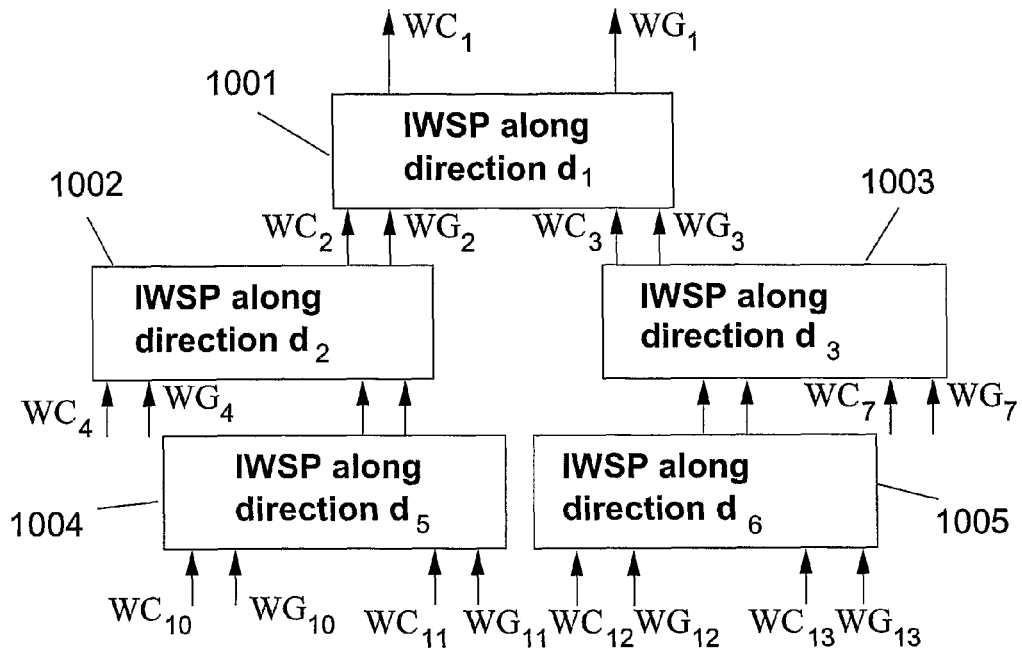
FIG. 10 shows, in block diagram form, an exemplary configuration of an inverse warped wavelet packet processor defined over the same binary tree as in FIG. 5.

The inverse warped wavelet packet processor (304) in FIG. 3 implements the inverse of the warped wavelet packet processor (204) in FIG. 2. It takes in input a warped wavelet packet transform including the warped coefficients at the leaves of a wavelet packet binary tree together with their warping grids, and it computes a warped signal. FIG. 10 shows an exemplary configuration of an inverse warped wavelet packet processor implemented with Inverse Warped Subband Processors (IWSP) that are distributed along the nodes of the same binary tree as the one illustrated in FIG. 5 and used by the warped wavelet packet processor (204). At each node p of this tree, the warped coefficients $WC_p$ and its warping grid $WG_p$ are reconstructed with an inverse warped subband processor in a particular direction d, from the children warped coefficients $WC_{2p}$ and $WC_{2p+1}$ together with their warping grids $WG_{2p}$ and $WG_{2p+1}$. The inverse warped wavelet packet processor outputs a warped signal including the warping grid $WG_1$ and the warped coefficients $WC_i$.

Figure 9:
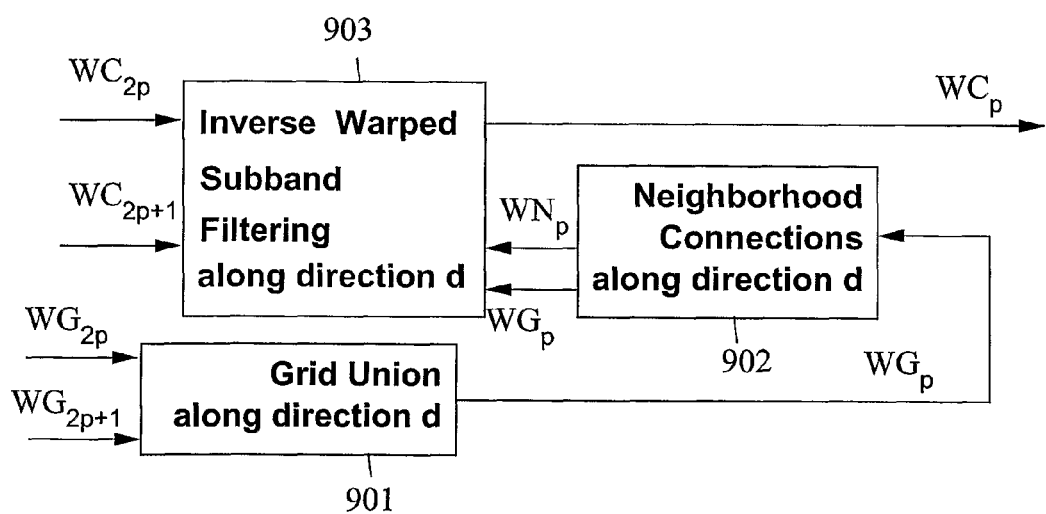
FIG. 9 shows, in block diagram form, an exemplary configuration of an Inverse Warped Subband Processor (IWSP) along direction d.

FIG. 9 shows, in block diagram form, an exemplary configuration of an Inverse Warped Subband Processor (IWSP) along direction d. It implements the inverse of the warped subband processor illustrated in FIG. 8. The processor (901) performs grid union in direction d by taking in input the warping grids $WG_{2p}$ and $WG_{2p+1}$ and computing $$WG_p(i, 2_d k) = WG_{2p}(i,k) \text{ and } WG_p(i, 2_d k + 1_d) = WG_{2p+1}(i,k),$$

and $RegWG_p(i) = 2_d RegWG_{2p}(i)$. In (902), the neighborhood connection processor in direction d is identical to the neighborhood connection processor (802) in FIG. 8. It computes a warped neighborhood map $WN_p$ which is an input together with $WG_p$ and the warped coefficients $WC_{2p}$ and $WC_{2p_1}$ in the inverse warped subband filtering processor (903) along direction d. This processor outputs the warped coefficients $WC_p$. Given the warped neighborhood map $WN_p$ and the warping grid $WC_p$, the processor (903) implements the inverse of the warped subband filtering processor in (803). Its detailed implementation was described together with the processor (803).

Warping Grid Subsampling

Figure 11:
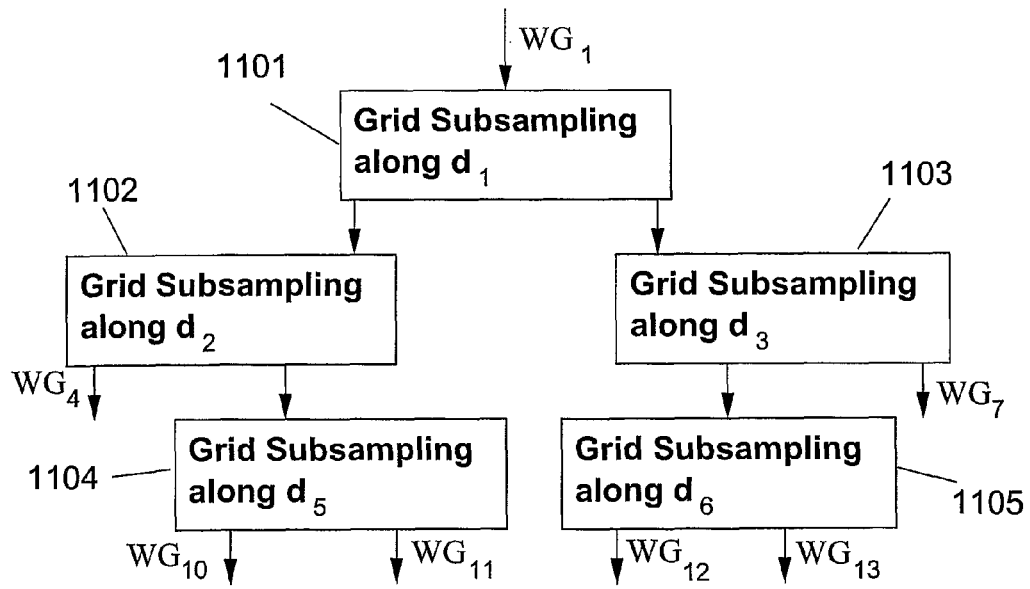
FIG. 11 shows, in block diagram form, an exemplary configuration of wavelet packet warping grid subsampling along the same binary tree as in FIG. 5.

The wavelet packet warping grid subsampling module (302) in FIG. 3 takes in input a warping grid WG and computes wavelet packet warping grids, with a procedure illustrated by the block diagram in FIG. 11. For convenience, the input warping grid is relabeled $WG_1$. This warping grid is then subsampled in different directions along the same binary tree as the one used to compute the warped wavelet packet processor (204). At each node p, the grid subsampling in direction $d_p$ is identical to the grid subsampling module in direction d that appears in (801) and was previously defined. The wavelet packet warping grids is the family of all warping grids $WG_p$ at all leaves $p \in P$ of the binary tree. In FIG. 11, it corresponds to $WG_4$, $WG_7$, $WG_{10}$, $WG_{11}$, $WG_{12}$ and $WG_{13}$, i.e. P={4, 7, 10, 11, 12, 13}.

Bandeletisation and Inverse Bandeletisation

Figure 12:
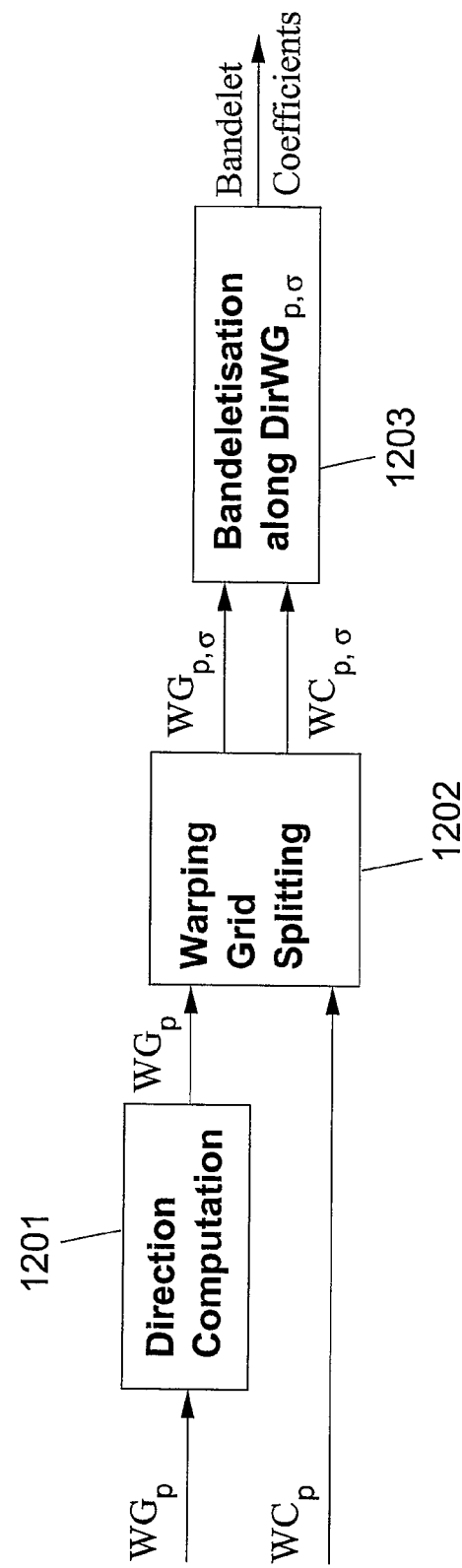
FIG. 12 shows, in block diagram form, an exemplary configuration of a bandeletisation processor.

The bandeletisation processor (205) takes in input a warped wavelet packet transform composed of warped coefficients $(WC_p)_{p \in P}$ and corresponding warping grids $(WG_p)_{p \in P}$ and outputs bandelet coefficients, by performing a sequence of 1-dimensional decorrelations along selected directions on the warped wavelet packet coefficients to reduce identified correlations in the signal and obtain a new, sparser representation of the signal. FIG. 12 illustrates an exemplary embodiment of a bandeletisation processor. For each input warping grid, the direction selection processor (1201) compute a decorrelation descriptor $DirWG_p(i)$ depicting what kind of decorrelation is to be performed on a region of warping grids $WG_p$. The input warping grids $WG_p$ and warped coefficient arrays $WC_p$ are split in module (1202) into subgrids $WG_{po}$ and subarrays $WC_{po}$ wherein the decorrelation descriptor is uniform and equal to some $DirWG_{po}$. The subarrays $WC_{po}$ are then transformed in the bandeletisation along $DirWG_{po}$ (1203) into a set of bandelet coefficients.

Figure 13:
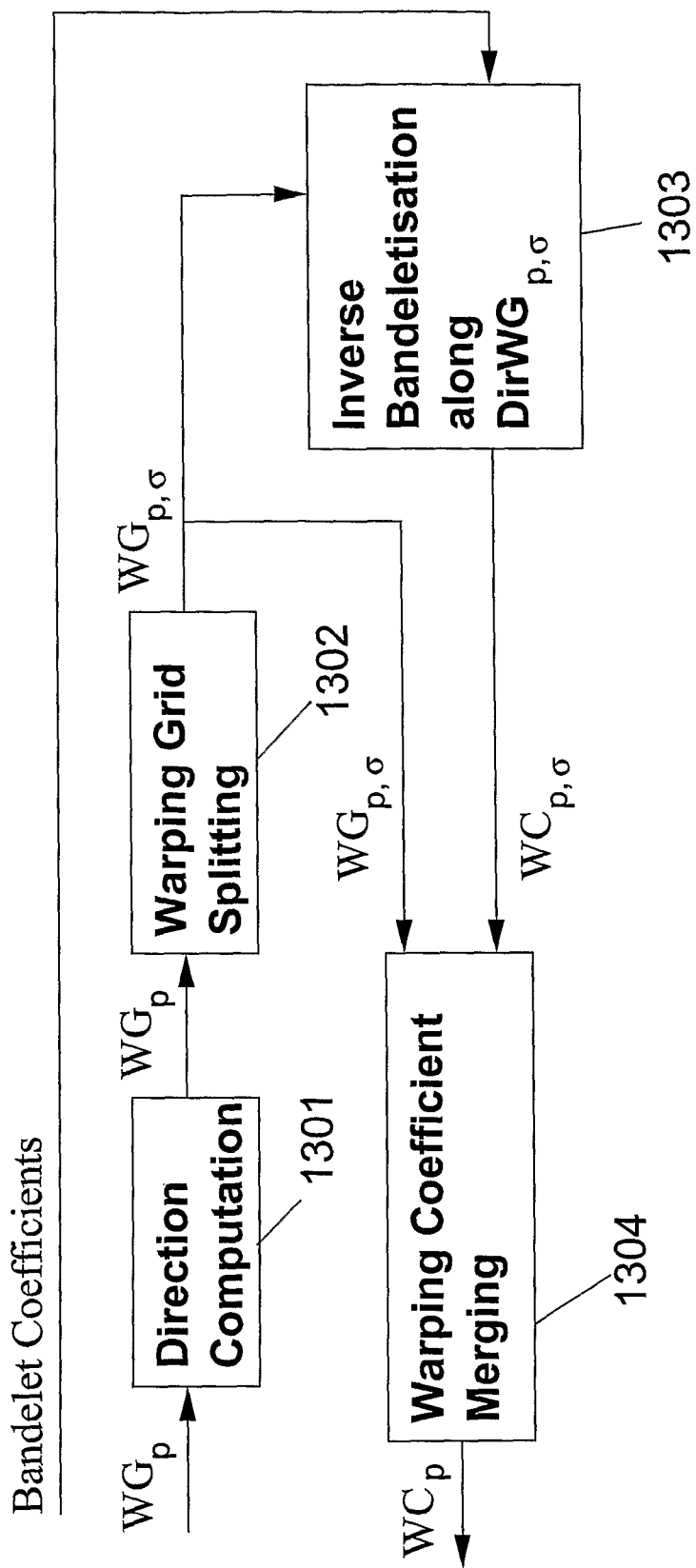
FIG. 13 shows, in block diagram form, an exemplary configuration of an inverse bandeletisation processor.

The inverse bandeletisation processor (303) takes in input wavelet packet warping grids $(WG_p)_{p \in P}$ and bandelet coefficients and outputs a warped wavelet packet transform composed of computed warped wavelet packet coefficients $(WC_p)_{p \in P}$, and of input wavelet packet warping grids $(WG_p)_{p \in P}$. FIG. 13 illustrates an exemplary embodiment of an inverse bandeletisation processor. Module (1301) computes decorrelation descriptors exactly as in module (1201). Module (1302) splits grids $WG_p$ into grids $WG_{po}$ exactly as in module (1202). The inverse bandeletisation along $DirWG_{po}$ (1303) computes from input bandelet coefficients warped coefficient arrays $WC_{po}$, which are then merged back into arrays $WC_p$ in the warped grid merging processor (1304).

In an exemplary embodiment, the regularity descriptor of a grid $RegWG_p(i)$ is a vector of n reals $(b_1, \ldots, b_n)$ that are dyadic or zero, and indicates what kind of warped coefficient regularity is expected for each grid $WG_p$ and each region i. For each direction d, $b_d=0$ means that no regularity has been detected along direction d, $0 < b_d \leq 1$ means that the warped coefficient array $WG_p$ has slow variations along direction d, and $b_d > 1$ means that the signal has close to periodic variations along direction d, of period $b_d$.

Depending on this regularity descriptor, a decorrelation descriptor $DirWG_p(i)$ is computed in module (1201) for each region i and each warping grid $WG_p$. The decorrelation descriptor is a vector of n integers, $(\beta_1, \ldots, \beta_n)$, indicating for each direction d if a decorrelation operation has to be performed along direction d (when $\beta_d > 0$), and then what kind of decorrelation has to be performed along that direction d in module (1203). Hence when $\beta_d=0$, no decorrelation along direction d is to be performed. When $\beta_d=1$, a decorrelation operator is applied along direction d, like for example a wavelet or wavelet packet transform, or a discrete cosine transform. When $\beta_d > 1$, a decorrelation operator performing a periodic decorrelation of period $\beta_d$ is applied. In an exemplary embodiment a decorrelation operator performing a periodic decorrelation of period $\beta_d$ for a 1-dimensional array of coefficients $(L(m))_{m \in M}$ is implemented with a one-dimensional wavelet or wavelet packet transform, or a discrete cosine transform applied to subarrays of L of stride $\beta_d$, i.e. on the subarrays $(L(\beta_d m+r))_{\beta_d m + r \in M}$ for $r=0, \ldots, \beta_d-1$.

In an exemplary embodiment, the decorrelation descriptor $DirWG_p(i)$ is computed from $RegWG_p(i)=(b_1, \ldots, b_n)$ by setting $DirWG_p(i)=(\beta_1, \ldots, \beta_n)$ where $\beta_d=0$ if $b_d=0$, $\beta_d=1$ if $0 < b_d < 1$, and $\beta_d=b_d$ otherwise. In a degenerate case where $RegWG_p(i)=(0, \ldots, 0)$, the decorrelation descriptor is equal to $(0, \ldots, 0)$, in which case the bandeletisation performs no decorrelation and outputs coefficients that are the input warped wavelet packet coefficients.

In yet another exemplary embodiment wherein the input warped wavelet packet coefficients are warped wavelet coefficients, the decorrelation descriptor $DirWG_p(i)$ is computed in the same way as above, except when $0 < b_d < 1$, in which case $\beta_d=1$ if the warped wavelet coefficients of $WC_p$ are low-pass along the direction d and $\beta_d=0$ otherwise. Warped wavelet coefficients $WC_p$ are said to be low-pass along the direction d if in the chain of warped subband processings to compute $WC_p$ from $WC_1$, $WC_p$ is the low-pass output of the last warped subband processing in direction d, or if it has been computed from this low-pass output with further warped subband processings in other directions but not in the direction d.

In yet another exemplary embodiment, the decorrelation descriptor $DirWG_p(i)$ is computed according to one of the two above embodiments, except when all $0 < b_d < 1$ for all d, in which case we set $DirWG_p(i)=(0, \ldots, 0)$ instead. This corresponds to the case where no further decorrelation is necessary because the warped signal is uniformly regular in all directions and hence the warped wavelet packet co-efficients array is already sparse. The same descriptors are needed in the inverse bandeletisation processor, so module (1301) is identical to (1201).

In an exemplary embodiment, the bandeletisation processor applies decorrelation operators separately on each region i. In a preferred embodiment, the bandeletisation processor operates across regions whenever this is possible, i.e. whenever two regions are processed according to the same decorrelation descriptor $DirWG_p(i)$. An exemplary method to apply different decorrelation operators for warping grids corresponding to different regions i consists in first splitting the input warping grids $WG_p$ and warped coefficient arrays $WC_p$ into grids $(WG_{po})_{o \in \Sigma}$ and subarrays $(WC_{po})_{o \in \Sigma}$, over which the decorrelation descriptor $DirWG_p(i)$ is the same, and then computing neighborhood connection graphs $WN_{po}$ for each resulting grid $WG_{po}$. In module (1202), $WG_{po}$ and $WC_{po}$ are then defined by $WG_{po}(i, k)=WG_p(i, k)$ if $DirWG_p(i)=\sigma$ and $WG_{po}(i, k)=nil$ otherwise, and similarly $WC_{po}(i, k)=WC_p(i, k)$ if $DirWG_p(i)=\sigma$ and $WC_{po}(i, k)=nil$ otherwise, where the $\sigma$ index is a decorrelation descriptor. The case where the decorrelation operators act separately on each grid is implemented by splitting the warping grids $WG_p$ and warped coefficient arrays $WC_p$ according to the region index. We set $WG_{po}(i, k)=WG_p(i, k)$ if $\sigma=i$ and $WG_{po}(i, k)=nil$ otherwise, and similarly for $WC_{po}$, where $\sigma$ is now a region index. In all cases, the decorrelation descriptor $DirWG_p(i)$ is the same for all region indexes i of the warping grids $WG_{po}$, (i.e. all i such that there exists a k with $WG_{po}(i, k) \neq nil$). We thus write this decorrelation descriptor $DirWG_{po}$. The decorrelation dimension $DimWG_P$ of the wavelet packet warping grids $(WG_p)_{p \in P}$ is then defined as the maximum number of nonzero entries in a vector $DirWG_{po}$ for all possible p and $\sigma$. It is the maximum number of directions along which a bandelet decorrelation will be performed within a single grid.

In an inverse bandeletisation, the warping grids $WG_{po}$ are computed from the warping grids $WG_p$ in module (1302) in the same way as in module (1202). Module (1302) differs however from module (1202), in that it does not compute and output the warping coefficients $WC_{po}$.

In the degenerated case where all vectors $DirWG_{po}$ are zero vectors $(0, \ldots, 0)$, then the decorrelation dimension $DimWG_P$ is equal to 0 and the bandeletisation outputs bandelet coefficients equal to the input warped wavelet packet coefficients.

If the decorrelation dimension $DimWG_P$ is equal to 1 then the number of directions along which a decorrelation operator has to be applied is at most equal to 1, i.e. each vector $DirWG_{po}$ has at most one nonzero entry. This happens most often for 1-dimensional or 2-dimensional input signals. In this case, the decorrelation operator operates along lines of the warped wavelet packet coefficients, and in particular inside each grid along a single direction. This particular implementation of a bandeletisation is called a one-dimensional bandeletisation. For each set of warping grids $WG_{po}$ the vector $DirWG_{po}$ either contains a single coefficient $\beta_d > 0$, in which case the corresponding d is denoted $d_{po}$ and the corresponding value $\beta_d$ is denoted $\beta_{po}$, or $DirWG_{po}$ only contains zero entries, in which case we set $\beta_{po}=d_{po}=nil$. The bandeletisation along $\text{DirWG}_{p\sigma}$ in module (1203) then consists in applying when $d_{p\sigma}\neq$nil a decorrelation operator along separate lines of each warped coefficient array $\text{WC}_{p\sigma}$ along the single direction $d_{p\sigma}$. In an exemplary embodiment, the module (1203) computes for each set of warping grids $\text{WG}_{p\sigma}$ a neighborhood connection graph $\text{WN}_{p\sigma}(i, k, -1, d_{p\sigma})$ as done for grids $\text{WG}_p$ in module (802). Then, each set of warping grids $\text{WG}_{p\sigma}$ is decomposed into a union of connected lines along direction $d_{p\sigma}$. To do this, we traverse $\text{WN}_{p\sigma}$ to build an array of line beginning points $\text{Begin}_{p\sigma}(q)=(i, k)$ that are points of $\text{WG}_{p\sigma}$ that have no left neighbor: $\text{WN}_{p\sigma}(i, k, -1, d_{p\sigma})=$nil. Each line indexed by $q$ of $\text{WG}_{p\sigma}$ commences with $L_{p\sigma q}(0)=\text{Begin}_{p\sigma}(q)$. The line is iteratively augmented with the right neighbor of the preceding point: if $(i, k)=L_{p\sigma q}(m)$, $L_{p\sigma q}(m+1)=\text{WN}_{p\sigma}(i, k, 1, d_{p\sigma})$, until that point is nil.

Then, each line of coefficients $C_{p\sigma q}(m)=\text{WC}_{p\sigma}(L_{p\sigma q}(m))$ for $p$ and $\sigma$ such that $\beta_{p\sigma}=1$ is transformed into a new array $D_{p\sigma q}$ with a one-dimensional invertible decorrelation operator. In an exemplary embodiment, this invertible decorrelation operator may be a wavelet transform, a wavelet packet transform, a discrete cosine or sine transform, computed with a fast algorithm as described in S. Mallat, "A wavelet tour of signal processing", Academic Press, 1998. Each line of coefficients for which $\beta_{p\sigma}>1$ is transformed with a one-dimensional decorrelation operator performing a periodic decorrelation of period $\beta_{p\sigma}$. In an exemplary embodiment of a periodic decorrelation operator, for each $r=0, \ldots, \beta_{p\sigma}-1$, the subarray $(C_{p\sigma q}(\beta_{p\sigma}m+r))_m$ is transformed by the one-dimensional invertible decorrelation operator, and the result is stored into $(D_{p\sigma q}(\beta_{p\sigma}m+r))_m$. The transformed coefficients of $D_{p\sigma q}$ are then stored back into arrays $\text{WC}_{p\sigma 0}$ by setting $\text{WC}_{p\sigma 0}(L_{p\sigma q}(m))=D_{p\sigma q}(m)$. When $d_{p\sigma}=$nil, the array $\text{WC}_{p\sigma 0}$ is equal to $\text{WC}_{p\sigma}$. The bandelet transform of the warped coefficient arrays $(\text{WC}_p)_{p\in P}$ is then composed of the coefficient arrays $\text{WC}_{p\sigma 0}$ for all $p$ and $\sigma$.

If the decorrelation dimension $\text{DimWG}_P$ is equal to 1 then the inverse bandeletisation is called an inverse one-dimensional bandeletisation and it implements the inverse transform of the one-dimensional bandeletisation. In this case, the inverse bandeletisation along $\text{DirWG}_{p\sigma}$ of (1303) is implemented with the same procedure as (1203), but by replacing the one-dimensional decorrelation operators used in the bandeletisation along $\text{DirWG}_{p\sigma}$ by their inverses, called one-dimensional inverse decorrelation operators. In the exemplary embodiment, where the decorrelation operators are either wavelet transforms, wavelet packet transforms, discrete cosine or sine transforms, their inverse is computed with fast algorithms described in S. Mallat, "A wavelet tour of signal processing", Academic Press, 1998. The inverses of one-dimensional decorrelation operators performing a periodic decorrelation are called periodic inverse decorrelation operators.

We now describe the implementation of a bandeletisation when the decorrelation dimension $\text{DimWG}_P$ is strictly larger than 1. In this case there is at least one region where the bandeletisation applies one-dimensional decorrelation operators along different directions inside the same region. Inside any such region, each decorrelation operator must then be phase-aligned. The bandeletisation is then called a phase-aligned bandeletisation. In a preferred embodiment, the bandeletisation along $\text{DirWG}_{p\sigma}$ is computed with phase aligned warped wavelet packet transforms, which are applied separately to each pair $\text{WG}_{p\sigma}$ and $\text{WC}_{p\sigma}$. Each one-dimensional decorrelation operator is then implemented with a phase-aligned warped subband processing. For each $p$ and $\sigma$, we write $\text{DirWG}_{p\sigma}$ as $(\beta_{p\sigma 1}, \ldots, \beta_{p\sigma n})$. To implement periodic decorrelations with phase aligned warped wavelet packet transforms, in an exemplary embodiment the warping grids $\text{WG}_{p\sigma}$ and warped coefficients $\text{WC}_{p\sigma}$ are subsampled along each direction $d$ for which $\beta_{p\sigma d}>1$. To include the non-periodic decorrelation in the same framework, the grids are subsampled by a factor of $\beta_{p\sigma d}$ if $\beta_{p\sigma d}>1$ and not subsampled, or equivalently subsampled by a factor 1, if $\beta_{p\sigma d}=0$ or 1. We thus define $\bar{\beta}_{p\sigma d}=1$ if $\beta_{p\sigma d}=0$ and $\bar{\beta}_{p\sigma d}=\beta_{p\sigma d}$ otherwise. For each $p$ and $\sigma$, we define $R_{p\sigma}$ as the set of integer vectors $r=(r_1, \ldots, r_n)$ such that $0 \leq r_d < \bar{\beta}_{p\sigma d}$ for $d=1, \ldots, n$. The subsampled warping grids and warped coefficient arrays $\text{WG}_{p\sigma r}$ and $\text{WC}_{p\sigma r}$ are then defined for each $r\in R_{p\sigma}$ as $$WG_{p\sigma r}(i,k_1, \ldots, k_n)=WG_{p\sigma}(i,k_1\bar{\beta}_1+r_1, \ldots, k_n\bar{\beta}_n+r_n)$$

$$WC_{p\sigma r}(i,k_1, \ldots, k_n)=WC_{p\sigma}(i,k_1\bar{\beta}_1+r_1, \ldots, k_n\bar{\beta}_n+r_n)$$

This subsampling for each $p$, $\sigma$ yields a family of warping grids $(WG_{p\sigma r})_{p\in P, \sigma\in\Sigma, r\in R_{p\sigma}}$ and warped coefficient arrays $(WC_{p\sigma r})_{p\in P, \sigma\in\Sigma, r\in R_{p\sigma}}$. Each pair $WG_{p\sigma r}$, $WC_{p\sigma r}$ then undergoes a phase warped wavelet packet transform exemplified in FIG. 5, with a binary tree $T_{p,\sigma}$ of one-dimensional warped subband processings to compute $(WG_{p\sigma rq})_{q\in Q_{p\sigma}}$ and $(WC_{p\sigma rq})_{q\in Q_{p\sigma}}$. Each binary tree $T_{p\sigma}$ includes one-dimensional decorrelation operators that are phase aligned warped subband processings performed only in directions $d$ for which $\beta_{p\sigma d}>0$. In an exemplary embodiment, the binary tree $T_{p\sigma}$ is a warped wavelet transform binary tree over the subset of directions $d$ for which $\beta_{p\sigma d}>0$. When a coefficient array $WC_{p\sigma r}$ is subsampled along direction $d$ with $\bar{\beta}_{p\sigma d}>0$, the phase aligned warped subband processing along direction $d$ is said to perform a periodic decorrelation. The bandelet coefficients, which are the output of the bandeletisation illustrated in FIG. 12 are the coefficients $(WC_{p\sigma rq})_{p\in P, \sigma\in\Sigma, r\in R_{p\sigma}, q\in Q_{p\sigma}}$. These are the input of the inverse bandeletisation illustrated in FIG. 13.

The inverse phase-aligned bandeletisation implements the inverse of the operator implemented by the phase-aligned bandeletisation processor. In this case, the inverse bandeletisation along $\text{DirWG}_{p\sigma}$(1303) computes from the warping grids $WG_{p\sigma}$ all the subsampled warping grids $WG_{p\sigma r}$ with the same procedure as in the module (1203). Then for each $p$, $\sigma$, $r$, the warping grids $(WG_{p\sigma rq})_{q\in Q_{p\sigma}}$ are computed from $WG_{p\sigma r}$ with a tree of grid subsamplings corresponding to $T_{p\sigma}$, as illustrated in FIG. 11. For each $p$, $\sigma$, $r$, the warping grids $(WG_{p\sigma rq})_{q\in Q_{p\sigma}}$ and warped coefficient arrays $(WC_{p\sigma rq})_{q\in Q_{p\sigma}}$ are transformed by a phase aligned inverse warped wavelet packet processor implemented with the binary tree $T_{p\sigma}$ of phase aligned inverse warped subband processings, to compute a warped coefficient array $WC_{p\sigma r}$. When $\bar{\beta}_{p\sigma d}>0$, the phase aligned inverse warped subband processings are said to perform a periodic inverse decorrelation. Then, for each $p$ and $\sigma$, the warped coefficient arrays $(WC_{p\sigma r})_{r\in R_{p\sigma}}$ are merged back into $WC_{p\sigma}$ by setting $$WC_{p\sigma}(i,k_1\bar{\beta}_1+r_1, \ldots, k_n\bar{\beta}_n+r_n)=WC_{p\sigma r}(i,k_1, \ldots, k_n)$$

for each $r$ in $R_{p\sigma}$ and $k$ such that $WG_{p\sigma}(i, k_1\bar{\beta}_1+r_1, \ldots, k_n\bar{\beta}_n+r_n)\neq$nil.

For both the inverse one-dimensional bandeletisation processor or the inverse phase-aligned bandeletisation processor, for each $p\in P$ the warped coefficient arrays $(WC_{p\sigma})_{\sigma\in\Sigma}$ are merged back into $WC_p$ in the warping grid merging processor (1304) by setting $WC_p(i, k)=WC_{p\sigma}(i, k)$ if $\sigma$ is such that $WG_{p\sigma}(i, k)\neq$nil.

It is apparent to those skilled in the art that is also possible to combine one-dimensional bandeletisation and phase-aligned bandeletisation. Denoting $\text{DimWG}_{p\sigma}$ the decorrelation dimension of $WG_{p\sigma}$, which is the number of nonzero entries in $\text{DirWG}_{p\sigma}$, the combined bandeletisation consists in applying a one-dimensional bandeletisation on all grids $WG_{p_o}$ such that $DimWG_{p_o}=1$, and applying a phase-aligned bandeletisation on all grids $WG_{p_o}$ such that $DimWG_{p_o}>1$. The same rule is then used for the inverse combined bandeletisation.

Restoration System

A restoration system is implemented by using a restoration processor in the processor (102) of FIG. 1. A restoration processor computes a processed warping geometry and processed bandelet coefficients, and an inverse warped wavelet packet bandelet processor takes in input the processed warping geometry and processed bandelet coefficients to reconstruct a restored signal.

In an exemplary embodiment, a restoration processor removes additive noises, by applying diagonal operators to bandelet coefficients. A diagonal operator applied to a bandelet coefficients stored in $WC_q(i, k)$ computes $\theta_q(WC_q(i, k))$ where $\theta_q(x)$ is a linear or non-linear function. The function $\theta_q$ can be chosen to be a thresholding function which sets to zero the bandelet coefficients whose amplitude are smaller than a threshold $T_q$ whose value adapted to the noise properties. Examples of state-of-the-art linear or thresholding estimators are described in S. Mallat, A Wavelet Tour of Signal Processing, 2nd edition. Academic Press, San Diego, 1999. A regularization operator can also be applied to the warping geometry calculated from the input noisy signal, in order to suppress the effect of the noise on the signal geometry.

A restoration processor can also implement a signal deconvolution system, for example to deblur 2-dimensional images. In an exemplary embodiment, a diagonal operator is applied to bandelet coefficients where the diagonal operator is designed to approximate the deconvolution filter by multiplying each bandelet coefficient with an appropriate constant. A restoration processor can also implement any state of the operators on the bandelet coefficients and the warping geometry to restore an output signal for restoration systems, including inverse scattering systems, tomographic reconstruction systems, interpolation systems, or superresolution systems which reconstruct higher resolution signals.

Compression System

Figure 14:
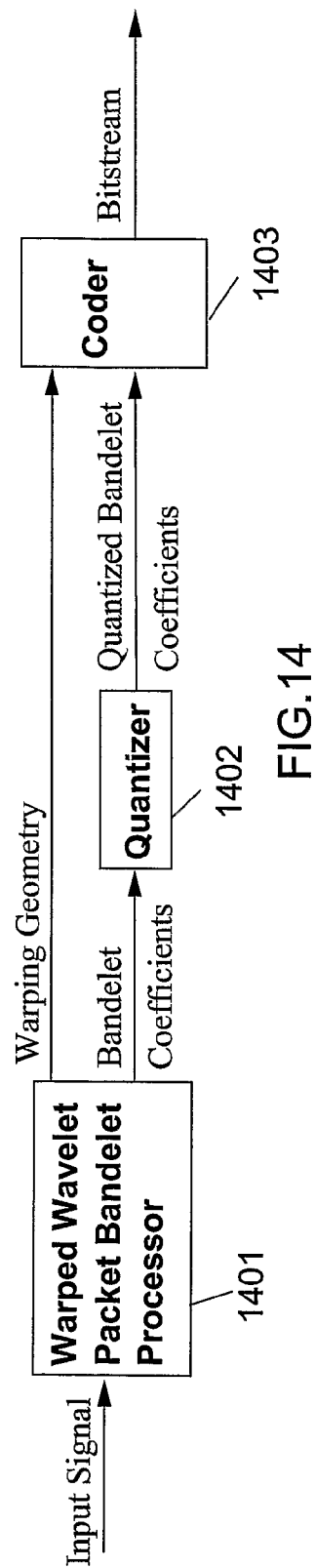
FIG. 14 shows, in block diagram form, an exemplary configuration of a processor unit for signal compression.

FIG. 14 illustrates an exemplary implementation of a signal compression system using the warped wavelet packet bandelet processor illustrated in FIG. 2. The input signal is transformed in (1401) into a warping geometry and a set of bandelet coefficients. The warping geometry is computed by a geometrical segmentation module (201) in FIG. 2, which includes a quantizer to compute the deformation parameters that specify the geometrical deformations in each signal region. The quantizer (1402) outputs quantized bandelet coefficients that are encoded together with the warping geometry by a binary coder (1403) to produce a bitstream. The quantizer (1402) may be any state of the art scalar or vector quantizer, adapted to the type of input signal and the configuration of the warped wavelet packet bandelet processor. In an exemplary embodiment, the quantizer is a uniform quantizer of a constant bin size T and with a zero bin twice larger than the other bins, and equal to [−T,T]. The binary coder (1403) may be any state of the art binary coder, including entropy coders such as an arithmetic coder, or a Huffman coder, or any entropy coder, as in T. M. Cover and J. A. Thomas, Elements of Information Theory, Wiley Series in Telecommunications, John Wiley & Sons, 1991. The entropy coding may also use multiple contexts to further reduce the code size.

An exemplary embodiment of such a compression system when n=1 is a compression system for electro-cardiograms (ECG), where the periodic decorrelation in the bandeletisation is particularly pertinent for decorrelating the periodic structure of the ECG. Yet another exemplary embodiment of such a compression system when n=2 is an image compression system computed with a warped wavelet transform, with a warping geometry that defines regions that are unions of rectangles. For particular class of images such as human faces, the warping geometry and its coding takes advantage of prior information known on this class of images. In yet another exemplary embodiment for special classes of images such as fingerprint images, the warped wavelet packet transform is adapted to the property of this class of images. The periodic decorrelation in the bandeletisation is pertinent for decorrelating the periodic ridge structures existing in fingerprint images.

Yet another embodiment of such a compression system, when n=3 is a video compression system using a warping geometry that includes a directional geometric deformation obtained by applying time displacements to 2-dimensional geometrical deformations using estimated motion vectors. Yet another exemplary embodiment when n=3 of such a compression system is a compressor for seismic 3-dimensional volumetric data or for 3-dimensional medical data. Yet another embodiment of such a compression system when n=4 is a compressor for light field volumes of data, such as the data obtained by composing digital pictures of an object taken with varying tilt and pan angles.

Figure 15:
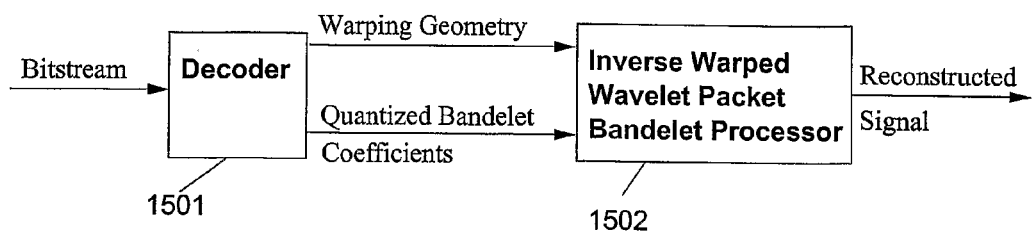
FIG. 15 shows, in block diagram form, an exemplary configuration of a processor unit for signal decompression.

FIG. 15 illustrates an exemplary implementation of a signal decompression system using the inverse warped wavelet packet and bandelet transform illustrated in FIG. 3. The processor (1501) decodes the input bitstream and outputs the warping geometry and the quantized bandelet coefficients, from which the inverse warped wavelet packet bandelet processor (1502), illustrated in FIG. 3, computes an output reconstructed signal.

Feature Extraction System

The present invention includes a system that computes a signal feature vector from the warping geometry and the bandelet coefficients, for pattern recognition applications including content based signal indexing and retrieval from a database, signal matching, or for detection and classification. The input signal is trans-formed into a warping geometry and bandelet coefficients by the warped wavelet packet bandelet processor illustrated in FIG. 2.

Figure 16:
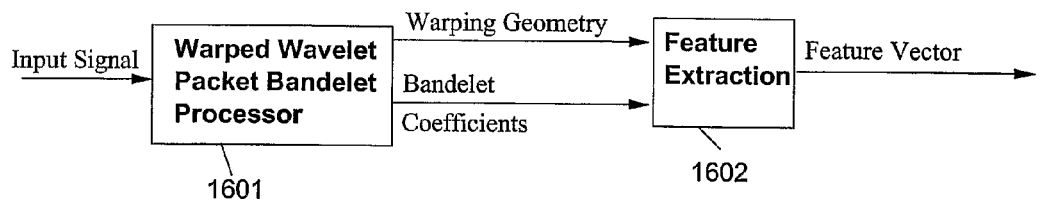
FIG. 16 shows, in block diagram form, an exemplary configuration of a processor unit for signal feature extraction.

In a first configuration of the system illustrated in FIG. 16, the warping geometry and the bandelet coefficients of an input signal are computed with a warped wavelet packet bandelet processor (1601) and a feature vector is calculated from the warping geometry and the bandelet coefficients by using a state of the art feature extraction procedure (1602). In an exemplary embodiment, the feature vector is used for a content-based indexing system. The feature extraction can be computed with histogram techniques applied to transformed bandelet coefficients as in M. K. Mandal and T. Aboulnasr, "Fast wavelet histogram techniques for image indexing", Computer Vision and Image Understanding, vol. 75, no. 1/2, pp. 99-110. Bandelet coefficients may be equal to warped wavelet coefficients for a degenerated bandeletisation where the decorrelation dimension is 0. The feature parameters obtained from the warping geometry describe geometrical signal properties whereas the parameters obtained from bandelet coefficients describe the evolution of the signal values along this geometry. For a content based signal retrieval from a data basis of signals, the signal feature vector is compared with the feature vectors of the signals stored in a data basis, using an appropriate distance measure. In yet another exemplary embodiment, feature vectors are used for signal matching and recognition by comparing the respective feature vectors of two signals. The feature extraction is performed with any state of the art procedure adapted to matching applications for a particular class of signals, for example fingerprint images or human face images. In yet another exemplary embodiment, feature vectors are used to classify signals. For an electro-cardiogram, a feature vector can be used by a state of the art classifier to make a diagnosis on the electro-cardiogram signal and detect anomalies.

Figure 17:
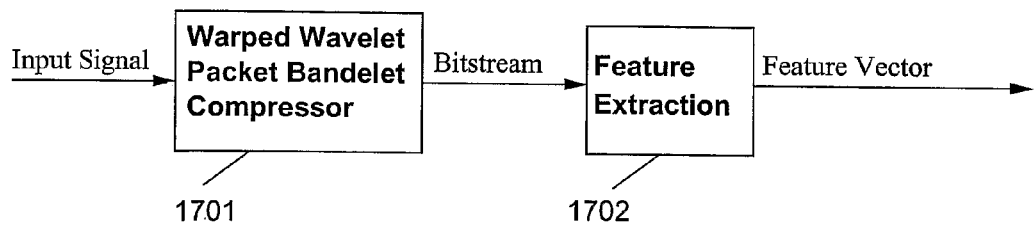
FIG. 17 shows, in block diagram form, an exemplary configuration of a processor unit for signal feature extraction computed from compressed data.

To reduce bandwidth and storage requirements, signals are represented in a compressed form. In a second exemplary configuration of the system illustrated in FIG. 17, the signal feature vector is computed (1701) from the compressed bitstream produced by the binary coder (1403) of the warped wavelet packet bandelet compression system illustrated in FIG. 14. Any state of the art technique may be used to compute the feature extraction. For content-based indexing and retrieval from a database, in an exemplary embodiment, the parameters of the feature extraction are obtained with state of the art histogram procedures as in E. Feig and C.-S. Li, "Computing image histogram from compressed data," Proceedings of SPIE 2898, 1996, pp. 118-124. For matching or classification of signals such as fingerprint images, images of human faces or electro-cardiograms or any other type of signals, any state of the art feature extraction system can be used to compute the feature vector.

While a detailed description of presently exemplary embodiments of the invention has been given above, various alternatives, modifications, and equivalents will be apparent to those skilled in the art. For example, while different components of the warped wavelet packet processor and inverse warped wavelet packet processor of the present invention are described herein as performing certain specific functions, one skilled in the art will appreciate that other components or circuits in the service module may perform some or all of such functions without varying from the spirit of the invention. Therefore, the above description should not be taken as limiting the scope of the invention which is defined by the appended claims.

The invention claimed is:

1. A signal restoration method, comprising the steps of:
   (a) receiving an n-dimensional digital input signal, n being an integer at least equal to 1;
   (b) providing region and deformation parameters defining a warping geometry, wherein the region parameters specify a partition of an n-dimensional signal support into a plurality of regions and the deformation parameters specify geometrical deformation functions respectively associated with said regions, whereby the geometrical deformation function associated with one of the regions provides positions of sampling points within said one of the regions;
   (c) computing an n-dimensional warped signal including n-dimensional warped coefficients and n-dimensional signal warping grids from said warping geometry and the received n-dimensional digital input signal;
   (d) computing warped wavelet packet coefficients and wavelet packet warping grids by applying an n-dimensional warped wavelet packet transform to said warped signal, with a binary tree where each node performs a one-dimensional warped subband processing along a respective dimension d, with $1 \leq d \leq n$;
   (e) applying a bandeletisation to said warped wavelet packet coefficients and wavelet packet warping grids, wherein said bandeletisation comprises computing bandelet coefficients by applying invertible one-dimensional decorrelation operators to said warped wavelet packet coefficients along selected directions of said wavelet packet warping grids;
   (f) applying a restoration process to said bandelet coefficients and said warping geometry to provide processed bandelet coefficients and processed warping geometry;
   (g) computing processed wavelet packet warping grids from said processed warping geometry;
   (h) computing processed warped wavelet packet coefficients by applying an inverse bandeletisation to said processed bandelet coefficients, wherein said inverse bandeletisation comprises computing processed warped wavelet packet coefficients by applying inverse one-dimensional decorrelation operators to said processed bandelet coefficients along selected directions of said processed wavelet packet warping grids;
   (i) computing a processed warped signal including n-dimensional processed warped coefficients and n-dimensional processed signal warping grids based on said processed warped wavelet packet coefficients and processed wavelet packet warping grids with a binary tree where each node performs a one-dimensional inverse warped subband processing along a particular dimension d, with $1 \leq d \leq n$; and
   (j) applying an inverse warping operation to said warped signal to produce a restored n-dimensional digital output signal.

2. A signal restoration method according to claim 1 wherein said restoration process comprises applying a thresholding operator to said bandelet coefficients.

3. A signal restoration method according to claim 1, wherein n=3 and the received n-dimensional digital input signal represents a video image sequence, and wherein the step of providing the parameters defining the warping geometry comprises:
   (a) estimating motion vectors within said video image sequence; and
   (b) determining at least one of said n-dimensional geometrical deformation functions by applying a time displacement to a 2-dimensional geometrical deformation using said estimated motion vectors.

4. A digital signal restoration system, comprising:
   a geometrical segmentation and sampling section to receive an n-dimensional digital input signal, n being an integer at least equal to 1, and to provide region and deformation parameters defining a warping geometry, wherein the region parameters specify a partition of an n-dimensional signal support into a plurality of regions and the deformation parameters specify geometrical deformation functions respectively associated with said regions, whereby the geometrical deformation function associated with one of the regions provides positions of sampling points within said one of the regions;
   a signal warping unit to compute an n-dimensional warped signal including n-dimensional warped coefficients and n-dimensional signal warping grids from said warping geometry and the received n-dimensional digital input signal;
   a warped wavelet packet processor to compute warped wavelet packet coefficients and wavelet packet warping grids by applying an n-dimensional warped wavelet packet transform to said warped signal with a binary tree where each node performs a one-dimensional warped subband processing along a respective dimension d, with $1 \leq d \leq n$;
   a bandeletisation unit to apply a bandeletisation to said warped wavelet packet coefficients and wavelet packet warping grids, wherein said bandeletisation comprises computing bandelet coefficients by applying invertible one-dimensional decorrelation operators to said warped wavelet packet coefficients along selected directions of said wavelet packet warping grids;

a processor to apply a restoration process to said bandelet coefficients and said warping geometry and provide processed bandelet coefficients and processed warping geometry;

a geometrical sampling and wavelet packet warping grid subsampling unit to compute processed wavelet packet warping grids from said processed warping geometry;

an inverse bandeletisation unit to compute processed warped wavelet packet coefficients by applying an inverse bandeletisation to said processed bandelet coefficients, wherein said inverse bandeletisation comprises computing processed warped wavelet packet coefficients by applying inverse one-dimensional decorrelation operators to said processed bandelet coefficients along selected directions of said processed wavelet packet warning grids;

an inverse warped wavelet packet processor to compute a processed warped signal including n-dimensional processed warped coefficients and n-dimensional processed signal warping grids based on said processed warped wavelet packet coefficients and processed wavelet packet warping grids with a binary tree where each node performs a one-dimensional inverse warped subband processing along a particular dimension d, with $1 \leq d \leq n$; and an inverse warping unit to apply an inverse warping operation to said warped signal to produce a restored n-dimensional digital output signal.

5. A non-transitory computer readable medium storing computer readable instructions that, when executed by at least one processor of a computer system, instruct the at least one processor to perform a method of restoring n-dimensional digital signals, the method comprising:

(a) receiving an n-dimensional digital input signal, n being an integer at least equal to 1;

(b) providing region and deformation parameters defining a warping geometry, wherein the region parameters specify a partition of an n-dimensional signal support into a plurality of regions and the deformation parameters specify geometrical deformation functions respectively associated with said regions, whereby the geometrical deformation function associated with one of the regions provides positions of sampling points within said one of the regions;

(c) computing an n-dimensional warped signal including n-dimensional warped coefficients and n-dimensional signal warping grids from said warping geometry and the received n-dimensional digital input signal;

(d) computing warped wavelet packet coefficients and wavelet packet warping grids by applying an n-dimensional warped wavelet packet transform to said warped signal with a binary tree where each node performs a one-dimensional warped subband processing along a respective dimension d, with $1 \leq d \leq n$;

(e) applying a bandeletisation to said warped wavelet packet coefficients and wavelet packet warping grids, wherein said bandeletisation comprises computing bandelet coefficients by applying invertible one-dimensional decorrelation operators to said warped wavelet packet coefficients along selected directions of said wavelet packet warping grids;

(f) applying a restoration process to said bandelet coefficients and said warping geometry to provide processed bandelet coefficients and processed warping geometry;

(g) computing processed wavelet packet warping grids from said processed warping geometry;

(h) computing processed warped wavelet packet coefficients by applying an inverse bandeletisation to said processed bandelet coefficients, wherein said inverse bandeletisation comprises computing processed warped wavelet packet coefficients by applying inverse one-dimensional decorrelation operators to said processed bandelet coefficients along selected directions of said processed wavelet packet warping grids;

(i) computing a processed warped signal including n-dimensional processed warped coefficients and n-dimensional processed signal warping grids based on said processed warped wavelet packet coefficients and processed wavelet packet warping grids with a binary tree where each node performs a one-dimensional inverse warped subband processing along a particular dimension d, with $1 \leq d \leq n$; and (j) applying an inverse warping operation to said warped signal to produce a restored n-dimensional digital output signal.

* * * * *